US009035233B2

United States Patent
Heslin et al.

(10) Patent No.: US 9,035,233 B2
(45) Date of Patent: *May 19, 2015

(54) ACCESSORY MOUNTING SYSTEM FOR MOUNTING AN ELECTRONIC DEVICE AT A WINDSHIELD OF A VEHICLE

(71) Applicant: Magna Electronics Inc., Auburn Hills, MI (US)

(72) Inventors: Patrick Heslin, Dublin (IE); Niall R. Lynam, Holland, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 278 days.

This patent is subject to a terminal disclaimer.

(21) Appl. No.: 13/749,833

(22) Filed: Jan. 25, 2013

(65) Prior Publication Data

US 2013/0135477 A1    May 30, 2013

Related U.S. Application Data

(60) Continuation of application No. 13/674,460, filed on Nov. 12, 2012, now Pat. No. 8,481,916, which is a continuation of application No. 12/759,305, filed on Apr. 13, 2010, now Pat. No. 8,309,907, which is a (Continued)

(51) Int. Cl.
*H01J 5/02* (2006.01)
*B60R 1/04* (2006.01)

(Continued)

(52) U.S. Cl.
CPC ... *B60R 1/04* (2013.01); *B60R 1/12* (2013.01); *B60R 11/02* (2013.01);

(Continued)

(58) Field of Classification Search
CPC ............. B60R 1/12; B60R 2001/1253; B60R 2011/0033; B60R 1/086; B60R 1/04; B60R 11/04; H04N 7/18; H04N 5/2253; H04N 5/217
USPC .......................... 250/239, 216, 227.25, 208.1; 359/229–242; 340/461, 485, 602
See application file for complete search history.

(56) References Cited

U.S. PATENT DOCUMENTS

| 1,472,509 | A | 6/1922 | Bitter |
| 2,414,223 | A | 1/1947 | DeVirgilis |

(Continued)

FOREIGN PATENT DOCUMENTS

| DE | 3515116 | 10/1986 |
| DE | 3525672 | 1/1987 |

(Continued)

OTHER PUBLICATIONS

"Bus". 696-1983 IEEE Standard 696 Interface Devices, http://ieeexplore.ieee.org/xpl/abstractStandardDictionary.jsp?&arnumber=579126, accessed Aug. 7, 2014.

(Continued)

*Primary Examiner* — Que T Le
(74) *Attorney, Agent, or Firm* — Gardner, Linn, Burkhart & Flory, LLP

(57) ABSTRACT

An accessory mounting system for mounting an electronic device at a windshield of a vehicle includes a bracket. The bracket is configured to mount at an interior surface of the vehicle windshield. The bracket includes an attaching structure configured to attach the bracket at the interior surface of the vehicle windshield. The bracket may include a support frame coupled to an attaching structure and to an adjustable support of an interior rearview mirror assembly. The support frame may have a set off portion set off from the interior surface of the windshield to accommodate an electronic device between the windshield and the set off portion.

51 Claims, 5 Drawing Sheets

Related U.S. Application Data continuation of application No. 12/467,660, filed on May 18, 2009, now Pat. No. 7,888,629, which is a continuation of application No. 12/197,660, filed on Aug. 25, 2008, now Pat. No. 7,538,316, which is a continuation of application No. 11/828,880, filed on Jul. 26, 2007, now Pat. No. 7,420,159, which is a continuation of application No. 11/699,271, filed on Jan. 29, 2007, now Pat. No. 7,265,342, which is a continuation of application No. 11/418,906, filed on May 5, 2006, now Pat. No. 7,262,406, which is a continuation of application No. 10/913,748, filed on Aug. 6, 2004, now Pat. No. 7,041,965, which is a continuation of application No. 10/618,334, filed on Jul. 11, 2003, now Pat. No. 6,774,356, which is a continuation of application No. 09/997,579, filed on Nov. 29, 2001, now Pat. No. 6,593,565, which is a continuation of application No. 09/433,467, filed on Nov. 4, 1999, now Pat. No. 6,326,613, which is a continuation-in-part of application No. 09/003,966, filed on Jan. 7, 1998, now Pat. No. 6,250,148, application No. 13/749,833, which is a continuation-in-part of application No. 13/621,385, filed on Sep. 17, 2012, now Pat. No. 8,534,887, which is a continuation of application No. 13/354,626, filed on Jan. 20, 2012, now Pat. No. 8,267,559, which is a continuation of application No. 13/071,177, filed on Mar. 24, 2011, now Pat. No. 8,100,568, which is a continuation of application No. 12/636,126, filed on Dec. 11, 2009, now Pat. No. 7,914,188, which is a continuation of application No. 12/339,786, filed on Dec. 19, 2008, now Pat. No. 7,658,521, which is a continuation of application No. 11/935,808, filed on Nov. 6, 2007, now Pat. No. 7,467,883, which is a continuation of application No. 11/835,088, filed on Aug. 7, 2007, now Pat. No. 7,311,428, which is a continuation of application No. 11/498,663, filed on Aug. 3, 2006, now Pat. No. 7,255,465, which is a continuation of application No. 11/064,294, filed on Feb. 23, 2005, now Pat. No. 7,108,409, which is a continuation of application No. 10/739,766, filed on Dec. 18, 2003, now Pat. No. 6,877,888, which is a continuation of application No. 10/134,775, filed on Apr. 29, 2002, now Pat. No. 6,672,744, which is a continuation of application No. 09/526,151, filed on Mar. 15, 2000, now Pat. No. 6,386,742, which is a division of application No. 08/918,772, filed on Aug. 25, 1997, now Pat. No. 6,124,886, application No. 13/749,833, which is a continuation-in-part of application No. 13/290,650, filed on Nov. 7, 2011, now Pat. No. 8,779,910, which is a continuation of application No. 13/033,942, filed on Feb. 24, 2011, now Pat. No. 8,063,753, which is a continuation of application No. 12/689,578, filed on Jan. 19, 2010, now Pat. No. 7,898,398, which is a continuation of application No. 12/339,775, filed on Dec. 19, 2008, now Pat. No. 7,667,579, which is a continuation of application No. 11/369,380, filed on Mar. 7, 2006, now Pat. No. 7,468,651, which is a continuation of application No. 10/913,186, filed on Aug. 6, 2004, now Pat. No. 7,012,543, which is a continuation of application No. 10/298,194, filed on Nov. 15, 2002, now Pat. No. 6,774,810, which is a continuation of application No. 09/993,813, filed on Nov. 14, 2001, now Pat. No. 6,483,438, which is a continuation of application No. 09/734,440, filed on Dec. 11, 2000, now Pat. No. 6,366,213, which is a continuation of application No. 09/244,726, filed on Feb. 5, 1999, now Pat. No. 6,172,613, which is a continuation-in-part of application No. 09/025,712, filed on Feb. 18, 1998, now Pat. No. 6,087,953.

(51) Int. Cl.
| | |
|---|---|
| *B60R 1/12* | (2006.01) |
| *B60R 11/02* | (2006.01) |
| *B60S 1/08* | (2006.01) |
| *G02F 1/15* | (2006.01) |
| *H04N 7/18* | (2006.01) |
| *B60R 11/00* | (2006.01) |
| *G02B 6/00* | (2006.01) |
| *G02B 27/01* | (2006.01) |

(52) U.S. Cl.
CPC ........ *B60R 11/0217* (2013.01); *B60R 11/0241* (2013.01); *B60R 11/0247* (2013.01); *B60R 2001/1223* (2013.01); *B60R 2001/1253* (2013.01); *B60R 2001/1284* (2013.01); *B60R 2011/0026* (2013.01); *B60R 2011/0033* (2013.01); *B60R 2011/0077* (2013.01); *B60S 1/0822* (2013.01); *B60S 1/0881* (2013.01); *B60S 1/0885* (2013.01); *G02B 6/00* (2013.01); *G02B 2027/0118* (2013.01); *G02B 2027/012* (2013.01); *G02F 1/15* (2013.01); *H04N 7/18* (2013.01)

(56) References Cited

U.S. PATENT DOCUMENTS

| | | |
|---|---|---|
| 3,208,070 A | 9/1965 | Boicey |
| 3,367,616 A | 2/1968 | Bausch |
| 3,575,375 A * | 4/1971 | Strem, Jr. .................. 248/481 |
| 3,870,404 A | 3/1975 | Wilson et al. |
| 4,065,750 A | 12/1977 | Duncan et al. |
| 4,254,931 A | 3/1981 | Aikens et al. |
| 4,274,078 A | 6/1981 | Isobe et al. |
| 4,286,305 A | 8/1981 | Pilat et al. |
| 4,443,057 A | 4/1984 | Bauer et al. |
| 4,645,975 A | 2/1987 | Meitzler et al. |
| 4,646,210 A | 2/1987 | Skogler et al. |
| 4,646,673 A | 3/1987 | Fordyce |
| 4,733,336 A | 3/1988 | Skogler et al. |
| 4,760,497 A | 7/1988 | Roston |
| 4,768,135 A | 8/1988 | Kretschmer et al. |
| 4,781,436 A | 11/1988 | Armbruster |
| 4,793,690 A | 12/1988 | Gahan et al. |
| 4,807,096 A | 2/1989 | Skogler et al. |
| 4,859,867 A | 8/1989 | Larson et al. |
| 4,863,130 A | 9/1989 | Marks, Jr. |
| 4,871,917 A | 10/1989 | O'Farrell et al. |
| 4,883,349 A | 11/1989 | Mittelhauser |
| 4,884,055 A | 11/1989 | Memmola |
| 4,886,960 A | 12/1989 | Molyneux et al. |
| 4,891,559 A | 1/1990 | Matsumoto et al. |
| 4,895,097 A | 1/1990 | Lechnir |
| 4,916,374 A | 4/1990 | Schierbeek et al. |
| 4,930,742 A | 6/1990 | Schofield et al. |
| 4,936,533 A | 6/1990 | Adams et al. |
| 4,956,591 A | 9/1990 | Schierbeek et al. |
| 4,967,319 A | 10/1990 | Seko |
| 4,973,844 A | 11/1990 | O'Farrell et al. |
| 5,058,851 A | 10/1991 | Lawlor et al. |
| 5,080,309 A | 1/1992 | Ivins |
| 5,096,287 A | 3/1992 | Kakinami et al. |
| 5,100,095 A | 3/1992 | Haan et al. |
| 5,111,289 A | 5/1992 | Lucas et al. |
| 5,140,455 A | 8/1992 | Varaprasad et al. |
| 5,151,816 A | 9/1992 | Varaprasad et al. |
| 5,160,780 A | 11/1992 | Ono et al. |
| 5,178,448 A | 1/1993 | Adams et al. |
| 5,193,029 A | 3/1993 | Schofield et al. |

(56) References Cited

U.S. PATENT DOCUMENTS

| | | |
|---|---|---|
| 5,255,442 A | 10/1993 | Schierbeek et al. |
| 5,264,997 A | 11/1993 | Hutchisson et al. |
| 5,266,873 A | 11/1993 | Arditi et al. |
| 5,327,288 A | 7/1994 | Wellington et al. |
| 5,330,149 A | 7/1994 | Haan et al. |
| D351,370 S | 10/1994 | Lawlor et al. |
| 5,361,190 A | 11/1994 | Roberts |
| 5,371,659 A | 12/1994 | Pastrick et al. |
| 5,377,949 A | 1/1995 | Haan et al. |
| 5,406,414 A | 4/1995 | O'Farrell et al. |
| 5,426,294 A | 6/1995 | Kobayashi et al. |
| 5,439,305 A | 8/1995 | Santo |
| 5,448,180 A | 9/1995 | Kienzler et al. |
| 5,455,716 A | 10/1995 | Suman et al. |
| 5,469,298 A | 11/1995 | Suman et al. |
| 5,475,366 A | 12/1995 | Van Lente et al. |
| 5,487,522 A | 1/1996 | Hook |
| 5,488,352 A | 1/1996 | Jasper |
| 5,497,306 A | 3/1996 | Pastrick |
| 5,521,760 A | 5/1996 | De Young et al. |
| 5,530,240 A | 6/1996 | Larson et al. |
| 5,537,003 A | 7/1996 | Bechtel et al. |
| 5,550,677 A | 8/1996 | Schofield et al. |
| 5,558,123 A | 9/1996 | Castel et al. |
| 5,566,224 A | 10/1996 | Azam et al. |
| 5,570,127 A | 10/1996 | Schmidt |
| 5,572,354 A | 11/1996 | Desmond et al. |
| 5,576,687 A | 11/1996 | Blank et al. |
| 5,582,383 A | 12/1996 | Mertens et al. |
| 5,587,236 A | 12/1996 | Agrawal et al. |
| 5,602,457 A | 2/1997 | Anderson et al. |
| 5,609,652 A | 3/1997 | Yamada et al. |
| 5,614,885 A | 3/1997 | Van Lente et al. |
| 5,615,857 A | 4/1997 | Hook |
| 5,631,638 A | 5/1997 | Kaspar et al. |
| 5,632,551 A | 5/1997 | Roney et al. |
| 5,649,756 A | 7/1997 | Adams et al. |
| 5,654,686 A | 8/1997 | Geschke et al. |
| 5,659,423 A | 8/1997 | Schierbeek et al. |
| 5,660,454 A | 8/1997 | Mori et al. |
| 5,661,455 A | 8/1997 | Van Lente et al. |
| 5,666,157 A | 9/1997 | Aviv |
| 5,669,698 A | 9/1997 | Veldman et al. |
| 5,669,705 A | 9/1997 | Pastrick et al. |
| 5,670,935 A | 9/1997 | Schofield et al. |
| 5,671,996 A | 9/1997 | Bos et al. |
| 5,689,241 A | 11/1997 | Clarke, Sr. et al. |
| 5,691,848 A | 11/1997 | Van Lente et al. |
| D388,107 S | 12/1997 | Huckins |
| 5,703,568 A | 12/1997 | Hegyi |
| 5,708,410 A | 1/1998 | Blank et al. |
| 5,708,743 A | 1/1998 | DeAndrea et al. |
| 5,710,633 A | 1/1998 | Klappenbach et al. |
| 5,719,551 A | 2/1998 | Flick |
| 5,760,962 A | 6/1998 | Schofield et al. |
| 5,774,283 A | 6/1998 | Nagel et al. |
| 5,786,772 A | 7/1998 | Schofield et al. |
| 5,796,094 A | 8/1998 | Schofield et al. |
| 5,796,176 A | 8/1998 | Kramer et al. |
| 5,798,575 A | 8/1998 | O'Farrell et al. |
| 5,804,719 A | 9/1998 | Didelot et al. |
| 5,820,097 A | 10/1998 | Spooner |
| 5,820,245 A | 10/1998 | Desmond et al. |
| 5,825,283 A | 10/1998 | Camhi |
| 5,837,891 A | 11/1998 | Bridge |
| 5,837,994 A | 11/1998 | Stam et al. |
| 5,845,000 A | 12/1998 | Breed et al. |
| 5,863,116 A | 1/1999 | Pastrick et al. |
| 5,877,897 A | 3/1999 | Schofield et al. |
| 5,878,353 A | 3/1999 | ul Azam et al. |
| 5,883,193 A | 3/1999 | Karim |
| 5,910,854 A | 6/1999 | Varaprasad et al. |
| 5,920,061 A | 7/1999 | Feng |
| 5,923,027 A | 7/1999 | Stam et al. |
| 5,926,087 A | 7/1999 | Busch et al. |
| 5,938,810 A | 8/1999 | De Vries, Jr. et al. |
| 5,940,503 A | 8/1999 | Palett et al. |
| 5,947,586 A | 9/1999 | Weber |
| 5,959,366 A | 9/1999 | Menke |
| 5,959,367 A | 9/1999 | O'Farrell et al. |
| 5,971,552 A | 10/1999 | O'Farrell et al. |
| 5,982,288 A | 11/1999 | Samatari et al. |
| 5,990,469 A | 11/1999 | Bechtel et al. |
| 6,000,823 A | 12/1999 | Desmond et al. |
| 6,006,159 A | 12/1999 | Schmier et al. |
| 6,020,704 A | 2/2000 | Buschur |
| 6,028,537 A | 2/2000 | Suman et al. |
| 6,056,410 A | 5/2000 | Hoekstra et al. |
| 6,066,933 A | 5/2000 | Ponziani |
| 6,087,942 A | 7/2000 | Sleichter, III et al. |
| 6,087,953 A | 7/2000 | DeLine et al. |
| 6,089,721 A | 7/2000 | Schierbeek |
| 6,097,023 A | 8/2000 | Schofield |
| 6,097,024 A | 8/2000 | Stam et al. |
| 6,100,798 A | 8/2000 | Liang |
| 6,108,084 A | 8/2000 | Winner |
| 6,124,647 A | 9/2000 | Marcus et al. |
| 6,124,886 A | 9/2000 | DeLine et al. |
| 6,151,065 A | 11/2000 | Steed et al. |
| 6,158,655 A | 12/2000 | DeVries, Jr. et al. |
| 6,166,625 A | 12/2000 | Teowee et al. |
| 6,166,698 A | 12/2000 | Turnbull et al. |
| 6,170,955 B1 | 1/2001 | Campbell et al. |
| 6,172,613 B1 | 1/2001 | DeLine et al. |
| 6,176,602 B1 | 1/2001 | Pastrick et al. |
| 6,198,087 B1 | 3/2001 | Boon |
| 6,198,409 B1 | 3/2001 | Schofield et al. |
| 6,207,967 B1 | 3/2001 | Hochstein |
| 6,210,008 B1 | 4/2001 | Hoekstra et al. |
| 6,218,934 B1 | 4/2001 | Regan |
| 6,222,460 B1 | 4/2001 | DeLine et al. |
| 6,229,226 B1 | 5/2001 | Kramer et al. |
| 6,229,434 B1 | 5/2001 | Knapp et al. |
| 6,243,003 B1 | 6/2001 | DeLine et al. |
| 6,250,148 B1 | 6/2001 | Lynam |
| 6,259,359 B1 | 7/2001 | Fujinami et al. |
| 6,276,821 B1 | 8/2001 | Pastrick et al. |
| 6,278,377 B1 | 8/2001 | DeLine et al. |
| 6,291,905 B1 | 9/2001 | Drummond et al. |
| 6,294,989 B1 | 9/2001 | Schofield et al. |
| 6,296,379 B1 | 10/2001 | Pastrick |
| 6,299,316 B1 | 10/2001 | Fletcher et al. |
| 6,299,319 B1 | 10/2001 | Mertens et al. |
| 6,302,545 B1 | 10/2001 | Schofield et al. |
| 6,305,807 B1 | 10/2001 | Schierbeek |
| 6,313,454 B1 | 11/2001 | Bos et al. |
| 6,318,697 B1 | 11/2001 | Corrado et al. |
| 6,320,176 B1 | 11/2001 | Schofield et al. |
| 6,323,477 B1 | 11/2001 | Blasing et al. |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,013 B1 | 1/2002 | Battiti et al. |
| 6,341,523 B2 | 1/2002 | Lynam |
| 6,353,392 B1 | 3/2002 | Schofield et al. |
| 6,366,213 B2 | 4/2002 | DeLine et al. |
| 6,386,742 B1 | 5/2002 | DeLine et al. |
| 6,389,340 B1 | 5/2002 | Rayner |
| 6,392,218 B1 | 5/2002 | Kuehnle |
| 6,396,397 B1 | 5/2002 | Bos et al. |
| 6,406,152 B1 | 6/2002 | Hoekstra et al. |
| 6,412,973 B1 | 7/2002 | Bos et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,445,287 B1 | 9/2002 | Schofield et al. |
| 6,452,148 B1 | 9/2002 | Bendicks et al. |
| 6,466,136 B2 | 10/2002 | DeLine et al. |
| 6,477,464 B2 | 11/2002 | McCarthy et al. |
| 6,483,438 B2 | 11/2002 | DeLine et al. |
| 6,496,117 B2 | 12/2002 | Gutta et al. |
| 6,498,620 B2 | 12/2002 | Schofield et al. |
| 6,498,967 B1 | 12/2002 | Hopkins et al. |
| 6,501,387 B2 | 12/2002 | Skiver et al. |

(56) References Cited

U.S. PATENT DOCUMENTS

| | | |
|---|---|---|
| 6,509,832 B1 | 1/2003 | Bauer et al. |
| 6,513,252 B1 | 2/2003 | Schierbeek et al. |
| 6,515,378 B2 | 2/2003 | Drummond et al. |
| 6,516,664 B2 | 2/2003 | Lynam |
| 6,523,964 B2 | 2/2003 | Larson et al. |
| 6,535,242 B1 | 3/2003 | Strumolo et al. |
| 6,545,598 B1 | 4/2003 | De Villeroche |
| 6,555,804 B1 | 4/2003 | Blasing |
| 6,564,122 B1 | 5/2003 | Huertgen et al. |
| 6,587,573 B1 | 7/2003 | Stam et al. |
| 6,587,968 B1 | 7/2003 | Leyva |
| 6,593,565 B2 | 7/2003 | Heslin et al. |
| 6,593,960 B1 | 7/2003 | Sugimoto et al. |
| 6,596,978 B2 | 7/2003 | Hochstein |
| 6,603,137 B2 | 8/2003 | Hochstein |
| 6,614,043 B2 | 9/2003 | Hochstein |
| 6,614,579 B2 | 9/2003 | Roberts et al. |
| 6,615,650 B2 | 9/2003 | Mahner et al. |
| 6,617,564 B2 | 9/2003 | Ockerse et al. |
| 6,646,359 B2 | 11/2003 | Schaefer et al. |
| 6,648,477 B2 | 11/2003 | Hutzel et al. |
| 6,653,615 B2 | 11/2003 | Bechtel et al. |
| 6,660,360 B2 | 12/2003 | Mertzel et al. |
| 6,672,744 B2 | 1/2004 | DeLine et al. |
| 6,672,745 B1 | 1/2004 | Bauer et al. |
| 6,681,163 B2 | 1/2004 | Stam et al. |
| 6,690,268 B2 | 2/2004 | Schofield et al. |
| 6,731,071 B2 | 5/2004 | Baarman |
| 6,734,904 B1 | 5/2004 | Boon et al. |
| 6,737,963 B2 | 5/2004 | Gutta et al. |
| 6,738,088 B1 | 5/2004 | Uskolovsky et al. |
| 6,742,904 B2 | 6/2004 | Bechtel et al. |
| 6,742,905 B2 | 6/2004 | Suyama et al. |
| 6,765,480 B2 | 7/2004 | Tseng |
| 6,768,092 B2 | 7/2004 | Sakata |
| 6,774,356 B2 | 8/2004 | Heslin et al. |
| 6,774,810 B2 | 8/2004 | DeLine et al. |
| 6,784,129 B2 | 8/2004 | Seto et al. |
| 6,799,904 B2 | 10/2004 | Schaefer et al. |
| 6,803,574 B2 | 10/2004 | Abel et al. |
| 6,806,485 B2 | 10/2004 | Jackson, Jr. |
| 6,811,330 B1 | 11/2004 | Tozawa |
| 6,812,645 B2 | 11/2004 | Baarman |
| 6,824,281 B2 | 11/2004 | Schofield et al. |
| 6,825,620 B2 | 11/2004 | Kuennen et al. |
| 6,831,268 B2 | 12/2004 | Bechtel et al. |
| 6,831,288 B1 | 12/2004 | Schmitt et al. |
| 6,832,719 B2 | 12/2004 | DeVries, Jr. et al. |
| 6,841,767 B2 | 1/2005 | Mindl et al. |
| 6,867,510 B2 | 3/2005 | Kramer et al. |
| 6,877,870 B2 | 4/2005 | Krug |
| 6,877,888 B2 | 4/2005 | DeLine et al. |
| 6,889,064 B2 | 5/2005 | Baratono et al. |
| 6,894,619 B1 | 5/2005 | Schmitt et al. |
| 6,917,163 B2 | 7/2005 | Baarman |
| 6,924,470 B2 | 8/2005 | Bechtel et al. |
| 6,930,593 B2 | 8/2005 | Crawshaw |
| 6,968,736 B2 | 11/2005 | Lynam |
| 6,975,215 B2 | 12/2005 | Schofield et al. |
| 6,975,390 B2 | 12/2005 | Mindl et al. |
| 6,980,092 B2 | 12/2005 | Turnbull et al. |
| 6,995,354 B2 | 2/2006 | Hagan et al. |
| 7,004,593 B2 | 2/2006 | Weller et al. |
| 7,016,783 B2 | 3/2006 | Hac et al. |
| 7,027,387 B2 | 4/2006 | Reinold et al. |
| 7,041,965 B2 | 5/2006 | Heslin et al. |
| 7,053,761 B2 | 5/2006 | Schofield et al. |
| 7,075,511 B1 | 7/2006 | Mousseau et al. |
| 7,108,409 B2 | 9/2006 | DeLine et al. |
| 7,111,996 B2 | 9/2006 | Seger et al. |
| 7,188,963 B2 | 3/2007 | Schofield et al. |
| 7,195,381 B2 | 3/2007 | Lynam et al. |
| 7,199,767 B2 | 4/2007 | Spero |
| 7,205,524 B2 | 4/2007 | Drummond et al. |
| 7,242,320 B2 | 7/2007 | Lawlor et al. |
| 7,249,860 B2 | 7/2007 | Kulas et al. |
| 7,255,451 B2 | 8/2007 | McCabe et al. |
| 7,255,465 B2 | 8/2007 | DeLine et al. |
| 7,262,406 B2 | 8/2007 | Heslin et al. |
| 7,265,342 B2 | 9/2007 | Heslin et al. |
| 7,289,037 B2 | 10/2007 | Uken et al. |
| 7,297,932 B2 | 11/2007 | Georgiadis et al. |
| 7,304,680 B2 | 12/2007 | Köhler et al. |
| 7,311,428 B2 | 12/2007 | DeLine et al. |
| 7,322,755 B2 | 1/2008 | Neumann et al. |
| 7,370,983 B2 | 5/2008 | DeWind et al. |
| 7,420,159 B2 | 9/2008 | Heslin et al. |
| 7,438,774 B2 | 10/2008 | Kurfiss et al. |
| 7,446,427 B2 | 11/2008 | Parker et al. |
| 7,460,007 B2 | 12/2008 | Schofield et al. |
| 7,467,883 B2 | 12/2008 | DeLine et al. |
| 7,480,149 B2 | 1/2009 | DeWard et al. |
| 7,490,944 B2 | 2/2009 | Blank et al. |
| 7,497,632 B2 | 3/2009 | Kajino et al. |
| 7,538,316 B2 | 5/2009 | Heslin et al. |
| 7,570,793 B2 | 8/2009 | Lages et al. |
| 7,609,961 B2 | 10/2009 | Park |
| 7,646,889 B2 | 1/2010 | Tsukamoto |
| 7,651,228 B2 | 1/2010 | Skiver et al. |
| 7,657,052 B2 | 2/2010 | Larson et al. |
| 7,658,521 B2 | 2/2010 | DeLine et al. |
| 7,697,028 B1 | 4/2010 | Johnson |
| 7,719,408 B2 | 5/2010 | DeWard et al. |
| 7,728,721 B2 | 6/2010 | Schofield et al. |
| 7,780,137 B2 | 8/2010 | Hansel et al. |
| 7,780,454 B2 | 8/2010 | Baranski |
| 7,811,011 B2 | 10/2010 | Blaesing et al. |
| 7,817,205 B2 | 10/2010 | Schulte et al. |
| 7,837,173 B2 | 11/2010 | Zinzer et al. |
| 7,855,353 B2 | 12/2010 | Blaesing et al. |
| 7,855,755 B2 | 12/2010 | Weller et al. |
| 7,860,275 B2 | 12/2010 | Leleve et al. |
| 7,864,981 B2 | 1/2011 | Leleve et al. |
| 7,888,629 B2 | 2/2011 | Heslin et al. |
| 7,889,086 B2 | 2/2011 | Schafer et al. |
| 7,911,356 B2 | 3/2011 | Wohlfahrt et al. |
| 7,914,188 B2 | 3/2011 | DeLine et al. |
| 7,916,009 B2 | 3/2011 | Schofield et al. |
| 7,940,305 B2 | 5/2011 | Adameck |
| 7,965,336 B2 | 6/2011 | Bingle et al. |
| 7,994,471 B2 | 8/2011 | Heslin et al. |
| 8,051,707 B2 | 11/2011 | Roehr et al. |
| 8,094,002 B2 | 1/2012 | Schofield et al. |
| 8,100,568 B2 | 1/2012 | DeLine et al. |
| 8,134,117 B2 | 3/2012 | Heslin et al. |
| 8,179,437 B2 | 5/2012 | Schofield et al. |
| 8,192,095 B2 | 6/2012 | Kortan et al. |
| 8,256,821 B2 | 9/2012 | Lawlor et al. |
| 8,288,711 B2 | 10/2012 | Heslin et al. |
| 8,309,907 B2 | 11/2012 | Heslin et al. |
| 8,325,028 B2 | 12/2012 | Schofield et al. |
| 8,339,453 B2 | 12/2012 | Blake, III et al. |
| 8,405,726 B2 | 3/2013 | Schofield et al. |
| 8,481,916 B2 | 7/2013 | Heslin et al. |
| 8,508,593 B1 | 8/2013 | Schofield et al. |
| 8,513,590 B2 | 8/2013 | Heslin et al. |
| 8,531,278 B2 | 9/2013 | DeWard et al. |
| 8,534,887 B2 | 9/2013 | DeLine et al. |
| 2002/0075387 A1 | 6/2002 | Janssen |
| 2002/0126457 A1 | 9/2002 | Kameyama |
| 2003/0070741 A1 | 4/2003 | Rosenberg et al. |
| 2004/0200948 A1 | 10/2004 | Bos et al. |
| 2005/0237385 A1 | 10/2005 | Kosaka et al. |
| 2006/0050018 A1 | 3/2006 | Hutzel et al. |
| 2006/0061008 A1 | 3/2006 | Karner et al. |
| 2007/0132610 A1 | 6/2007 | Guernalec et al. |
| 2007/0235638 A1 | 10/2007 | Backes et al. |
| 2008/0092673 A1 | 4/2008 | Hansel et al. |
| 2010/0208077 A1 | 8/2010 | DeWard et al. |
| 2011/0025850 A1 | 2/2011 | Maekawa et al. |
| 2011/0155874 A1 | 6/2011 | Roehr et al. |
| 2012/0224065 A1 | 9/2012 | Schofield et al. |
| 2012/0310519 A1 | 12/2012 | Lawlor et al. |
| 2014/0015976 A1 | 1/2014 | DeLine et al. |

(56) References Cited

U.S. PATENT DOCUMENTS

FOREIGN PATENT DOCUMENTS

| | | |
|---|---|---|
| DE | 3605704 | 8/1987 |
| DE | 3937576 | 11/1989 |
| DE | 9306989 | 7/1993 |
| DE | 4214223 | 11/1993 |
| DE | 4329983 | 3/1995 |
| DE | 29513369 | 12/1995 |
| DE | 29703084 | 4/1997 |
| DE | 19647200 | 1/1998 |
| DE | 29805142 | 6/1998 |
| DE | 19755008 | 7/1999 |
| DE | 10132982 | 1/2003 |
| DE | 10211444 | 10/2003 |
| DE | 10237554 | 3/2004 |
| DE | 10237607 | 3/2004 |
| DE | 10342837 | 4/2005 |
| DE | 102005002686 | 8/2006 |
| DE | 102005015973 | 10/2006 |
| DE | 102006039065 | 3/2007 |
| DE | 19530617 | 2/2009 |
| EP | 0169734 | 10/1989 |
| EP | 0461424 | 12/1991 |
| EP | 0602962 | 6/1994 |
| EP | 0667254 | 8/1995 |
| EP | 0756968 | 2/1997 |
| EP | 0677428 | 6/1998 |
| EP | 0928723 | 7/1999 |
| EP | 0969275 | 1/2000 |
| EP | 1058220 | 12/2000 |
| EP | 0860325 | 11/2002 |
| EP | 1376051 | 1/2004 |
| EP | 1389565 | 2/2004 |
| GB | 1008411 | 10/1965 |
| GB | 1178416 | 1/1970 |
| GB | 1197710 | 7/1970 |
| GB | 2210835 | 6/1989 |
| GB | 2316379 | 2/1998 |
| JP | 59029539 | 2/1984 |
| JP | 62043543 | 2/1987 |
| JP | S62131837 | 6/1987 |
| JP | 63258236 | 10/1988 |
| JP | 63258237 | 10/1988 |
| JP | 06113215 | 4/1994 |
| JP | 11069211 | 3/1999 |
| JP | H1178717 | 3/1999 |
| JP | H1178737 | 3/1999 |
| JP | 11131880 | 5/1999 |
| JP | 11254925 | 9/1999 |
| WO | WO9523082 | 8/1995 |
| WO | WO9618275 | 6/1996 |
| WO | WO9701246 | 1/1997 |
| WO | WO9748134 | 12/1997 |
| WO | WO9814974 | 4/1998 |
| WO | WO9914088 | 3/1999 |
| WO | WO9923828 | 5/1999 |
| WO | WO9943242 | 9/1999 |
| WO | WO0015462 | 3/2000 |
| WO | WO0164481 | 9/2001 |
| WO | WO0177763 | 10/2001 |
| WO | WO0126332 | 12/2001 |
| WO | WO02071487 | 9/2002 |

OTHER PUBLICATIONS

Goldbeck, J. et al., *Lane detection and tracking by video sensors*, Intelligent Transportation Systems, 1999. Proc., Oct. 5-8, 1999, pp. 74-49.

Lisowski, L., "*Specifications of a small electric vehicle: modular and distributed approach*", Intelligent Robots and Systems, 1997, IROS '97, Proceedings of the 1997 IEEE/RSJ International Conference on, vol. 2, Sep. 7-11, 1997.

Rayner et al., "I-Witness Black Box Recorder", Intelligent Transportation Systems Program, Final Report for ITS-IDEA Project 84, published Nov. 2001.

IPR Proceeding No. IPR2014-01355, filed Aug. 20, 2014, re U.S. Patent No. 8,481,916.

Jochem et al.; "PANS: a portable navigation platform", The Robotics Institute, Carnegie Mellon University, Pittsburgh, PA, no date.

"Combination of rain sensing, autolamps and telephone antenna in one module," Research Disclosure, Kenneth Mason Publications, Hampshire, GB No. 412, Aug. 1998, p. 1045XP-000824825.

N.R. Lynam, "Electrochromic Automotive Day/Night Minor," *SAE Technical Paper Series*, 870636 (1987).

N.R. Lynam, "Smart Windows for Automobiles," *SAE Technical Paper Series*, 900419 (1990).

N.R. Lynam and A. Agrawal, "Automotive Applications of Chromogenic Materials," from *Large Area Chromogenics: Materials and Devices for Transmittance Control*, C.M. Lampert and C.G. Granquist, EDS, Optical Engineering Press, Washington (1990).

SAE Technical Paper 2001-01-0072-LIN.

* cited by examiner

ACCESSORY MOUNTING SYSTEM FOR MOUNTING AN ELECTRONIC DEVICE AT A WINDSHIELD OF A VEHICLE

CROSS REFERENCE TO RELATED APPLICATIONS

The present application is a continuation of U.S. patent application Ser. No. 13/674,460, filed Nov. 12, 2012, now U.S. Pat. No. 8,481,916, which is a continuation of U.S. patent application Ser. No. 12/759,305, filed Apr. 23, 2010, now U.S. Pat. No. 8,309,907, which is a continuation of U.S. patent application Ser. No. 12/467,660, filed May 18, 2009, now U.S. Pat. No. 7,888,629, which is a continuation of U.S. patent application Ser. No. 12/197,660, filed Aug. 25, 2008, now U.S. Pat. No. 7,538,316, which is a continuation of U.S. patent application Ser. No. 11/828,880, filed Jul. 26, 2007, now U.S. Pat. No. 7,420,159, which is a continuation of U.S. patent application Ser. No. 11/699,271, filed Jan. 29, 2007, now U.S. Pat. No. 7,265,342, which is a continuation of U.S. patent application Ser. No. 11/418,906, filed May 5, 2006, now U.S. Pat. No. 7,262,406, which is a continuation of U.S. patent application Ser. No. 10/913,748, filed Aug. 6, 2004, now U.S. Pat. No. 7,041,965, which is a continuation of U.S. patent application Ser. No. 10/618,334, filed Jul. 11, 2003, now U.S. Pat. No. 6,774,356, which is a continuation of U.S. patent application Ser. No. 09/997,579, filed Nov. 29, 2001, now U.S. Pat. No. 6,593,565, which is a continuation of U.S. patent application Ser. No. 09/433,467, filed Nov. 4, 1999, now U.S. Pat. No. 6,326,613, which is a continuation-in-part of U.S. patent application Ser. No. 09/003,966, filed Jan. 7, 1998, now U.S. Pat. No. 6,250,148, the disclosures of which are hereby incorporated by reference herein. And the present application is also a continuation-in-part of U.S. patent application Ser. No. 13/621,385, filed Sep. 17, 2012, now U.S. Pat. No. 8,534,887, which is a continuation of U.S. patent application Ser. No. 13/354,626, filed Jan. 20, 2012, now U.S. Pat. No. 8,267,559, which is a continuation of U.S. patent application Ser. No. 13/071,177, filed Mar. 24, 2011, now U.S. Pat. No. 8,100,568, which is a continuation of U.S. patent application Ser. No. 12/636,126, filed Dec. 11, 2009, now U.S. Pat. No. 7,914,188, which is a continuation of U.S. patent application Ser. No. 12/339,786, filed Dec. 19, 2008, now U.S. Pat. No. 7,658,521, which is a continuation of U.S. patent application Ser. No. 11/935,808, filed Nov. 6, 2007, now U.S. Pat. No. 7,467,883, which is a continuation of U.S. patent application Ser. No. 11/835,088, filed Aug. 7, 2007, now U.S. Pat. No. 7,311,428, which is a continuation of U.S. patent application Ser. No. 11/498,663, filed Aug. 3, 2006, now U.S. Pat. No. 7,255,465, which is a continuation of U.S. patent application Ser. No. 11/064,294, filed Feb. 23, 2005, now U.S. Pat. No. 7,108,409, which is a continuation of U.S. patent application Ser. No. 10/739,766, filed Dec. 18, 2003, now U.S. Pat. No. 6,877,888, which is a continuation of U.S. patent application Ser. No. 10/134,775, filed Apr. 29, 2002, now U.S. Pat. No. 6,672,744, which is a continuation of U.S. patent application Ser. No. 09/526,151 filed Mar. 15, 2000, now U.S. Pat. No. 6,386,742, which is a division of U.S. patent application Ser. No. 08/918,772, filed Aug. 25, 1997, now U.S. Pat. No. 6,124,886. And the present application is also a continuation-in-part of U.S. patent application Ser. No. 13/290,650, filed Nov. 7, 2011, now U.S. Pat. No. 8,779,910, which is a continuation of U.S. patent application Ser. No. 13/033,942, filed Feb. 24, 2011, now U.S. Pat. No. 8,063,753, which is a continuation of U.S. patent application Ser. No. 12/689,578, filed Jan. 19, 2010, now U.S. Pat. No. 7,898,398, which is a continuation of U.S. patent application Ser. No. 12/339,775, filed Dec. 19, 2008, now U.S. Pat. No. 7,667,579, which is a continuation of U.S. patent application Ser. No. 11/369,380, filed Mar. 7, 2006, now U.S. Pat. No. 7,468,651, which is a continuation of U.S. patent application Ser. No. 10/913,186, filed Aug. 6, 2004, now U.S. Pat. No. 7,012,543, which is a continuation of U.S. patent application Ser. No. 10/298,194, filed Nov. 15, 2002, now U.S. Pat. No. 6,774,810, which is a continuation of U.S. patent application Ser. No. 09/993,813, filed Nov. 14, 2001, now U.S. Pat. No. 6,483,438, which is a continuation of U.S. patent application Ser. No. 09/734,440, filed Dec. 11, 2000, now U.S. Pat. No. 6,366,213, which is a continuation of U.S. patent application Ser. No. 09/244,726, filed Feb. 5, 1999, now U.S. Pat. No. 6,172,613, which is a continuation-in-part of U.S. patent application Ser. No. 09/025,712, filed Feb. 18, 1998, now U.S. Pat. No. 6,087,953.

BACKGROUND AND SUMMARY OF THE INVENTION

This invention relates to a vehicle interior mirror assembly.

According to the invention there is provided a vehicle interior rearview mirror assembly comprising a housing having a front end for releasable attachment to the interior surface of the vehicle windshield, a rear end having connection means for adjustably mounting a rearview mirror unit to the housing, the housing adapted for containing a rain sensor and biasing means in use biasing the rain sensor into contact with the interior surface of the windshield, the housing containing at least one further electrical component.

The invention further provides a vehicle interior rearview mirror assembly comprising a housing having a front end for releasable attachment to the interior surface of the vehicle windshield, a rear end having connection means for adjustably mounting a rearview mirror unit to the housing, the interior of the housing comprising at least one compartment, the compartment having an opening at the front end of the housing for facing in use towards the windshield and, the compartment adapted for containing a rain sensor and for biasing the rain sensor forwardly through the first opening into contact with the interior surface of the windshield, and the housing also containing at least one further electrical component.

The invention further provides a vehicle interior rearview mirror assembly comprising a housing having a front end for releasable attachment to the interior surface of the vehicle windshield, a rear end having connection means for adjustably mounting a rearview mirror unit to the housing, the interior of the housing comprising a compartment, the compartment having a first opening at the front end of the housing for facing in use towards the windshield and the compartment having a second opening on at least one side of the housing, the compartment containing a rain sensor and means for biasing the rain sensor forwardly through the first opening into contact with the interior surface of the windshield, and the compartment containing at least one further electrical component accessible through the second opening.

According to the present invention there is provided a vehicle interior rearview mirror assembly comprising a housing having a front end for releasable attachment to the interior surface of the vehicle windshield, a rear end having connection means for mounting a rearview mirror unit to the housing, and an internal wall subdividing the interior of the housing into first and second compartments, the first compartment having a first opening at the front end of the housing for facing in use towards the windshield and the second compartment having a second opening on at least one side of the housing, the first compartment containing a rain sensor and means for biasing the rain sensor forwardly through the first opening into contact with the interior surface of the windshield, and the second compartment containing at least one further electrical component accessible through the second opening.

The invention further provides a vehicle interior rearview mirror assembly comprising a housing having a front end for releasable attachment to the interior surface of the vehicle windshield, a rear end having connection means for releasably mounting a rearview mirror unit to the housing, a first opening at the front end of the housing for facing in use towards the windshield, and a second opening on at least one side of the housing for facing in use towards the top edge of the windshield, the housing containing a rain sensor, means for biasing the rain sensor forwardly through the first opening into contact with the interior surface of the windshield, and at least one further electrical component accessible through the second opening. The assembly further preferably including a removable cover which mates with the housing around the second opening and in use preferably extends along the windshield towards the vehicle header, and electrical leads for the rain sensor and the further electrical component which in use are routed under the cover to the header.

The invention provides the significant advantage that a vehicle manufacturer is provided with the possibility of optionally including a variety of components with the rear view mirror assembly. This possibility is made available for example during the assembly line process where the desired components to meet a particular specification can be included in the rear view mirror assembly. Furthermore, the removable cover readily provides for the functional advantage of readily incorporating a selected component whilst at the same time providing a functionally attractive cover. The automaker is therefore provided with the considerable advantage of the possibility of providing a plurality of diverse options quickly and speedily during the assembly line process.

An embodiment of the invention will now be described, by way of example, with reference to the accompanying drawings, in which:

In certain of the figures some components are omitted or shown in dashed outline to reveal the underlying structure.

DESCRIPTION OF THE PREFERRED EMBODIMENTS

Figure 2:
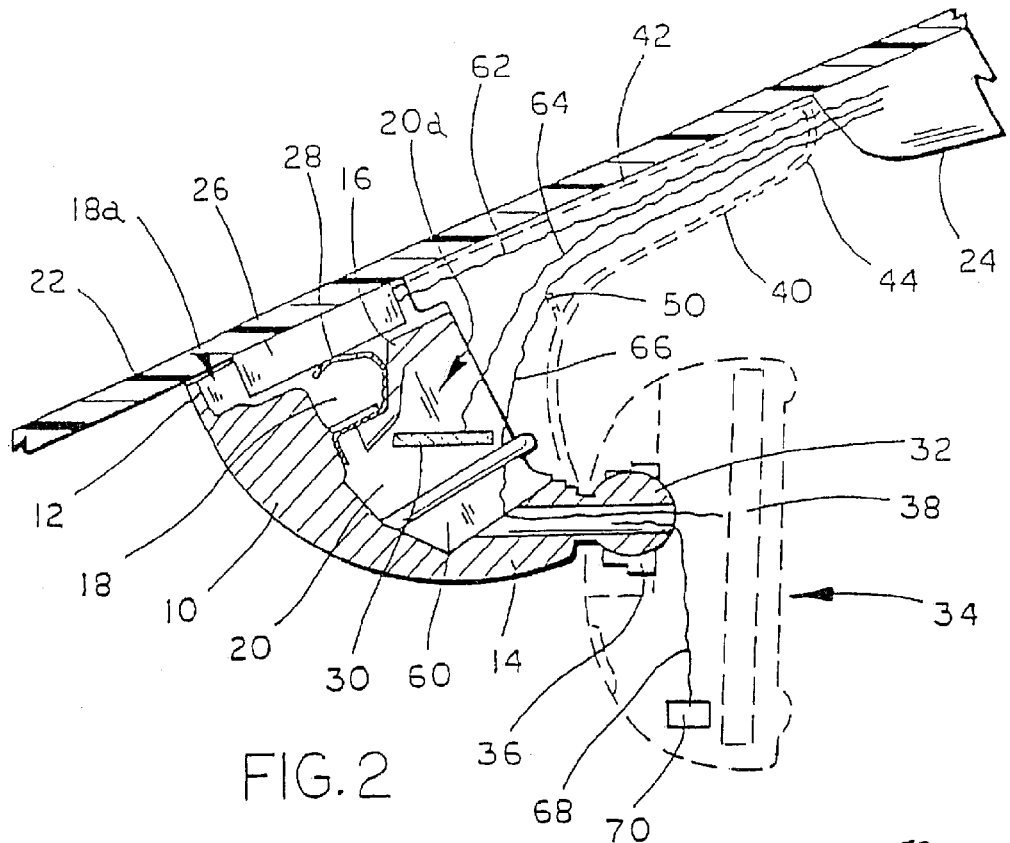
FIG. 2 is a cross-section through the mirror assembly of FIG. 1.
Figure 1:
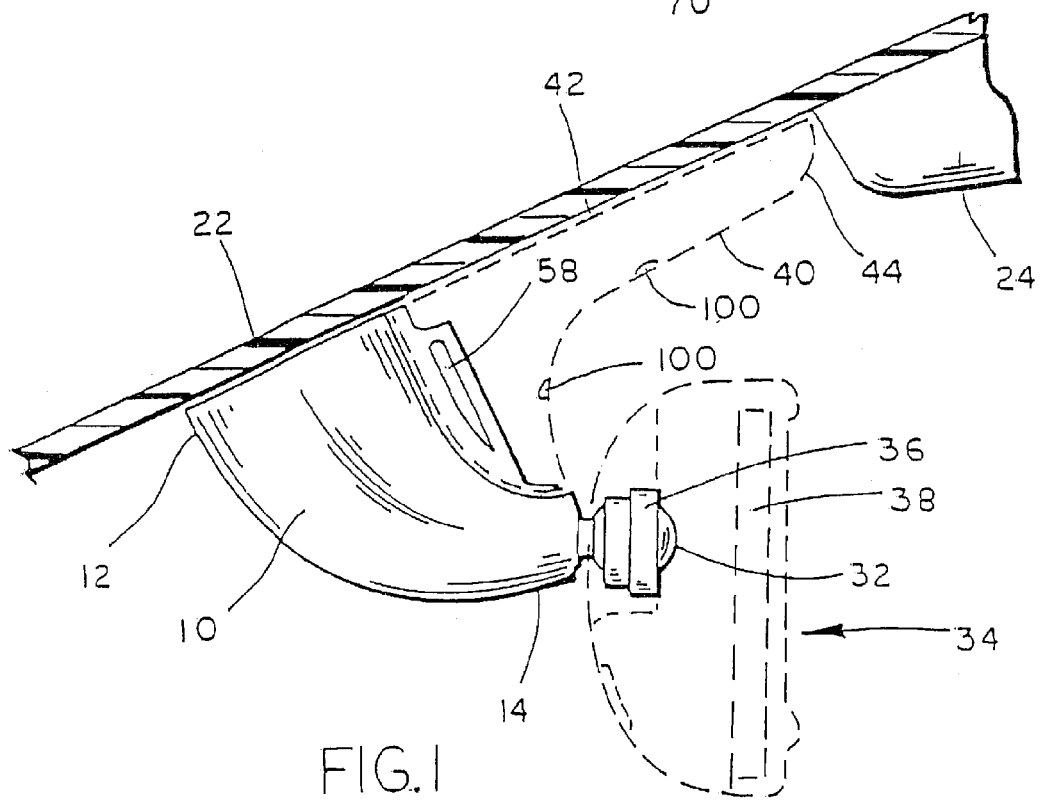
FIG. 1 is a side view of an embodiment of a vehicle interior mirror assembly according to the invention attached to the interior surface of a windshield.
Figure 3:
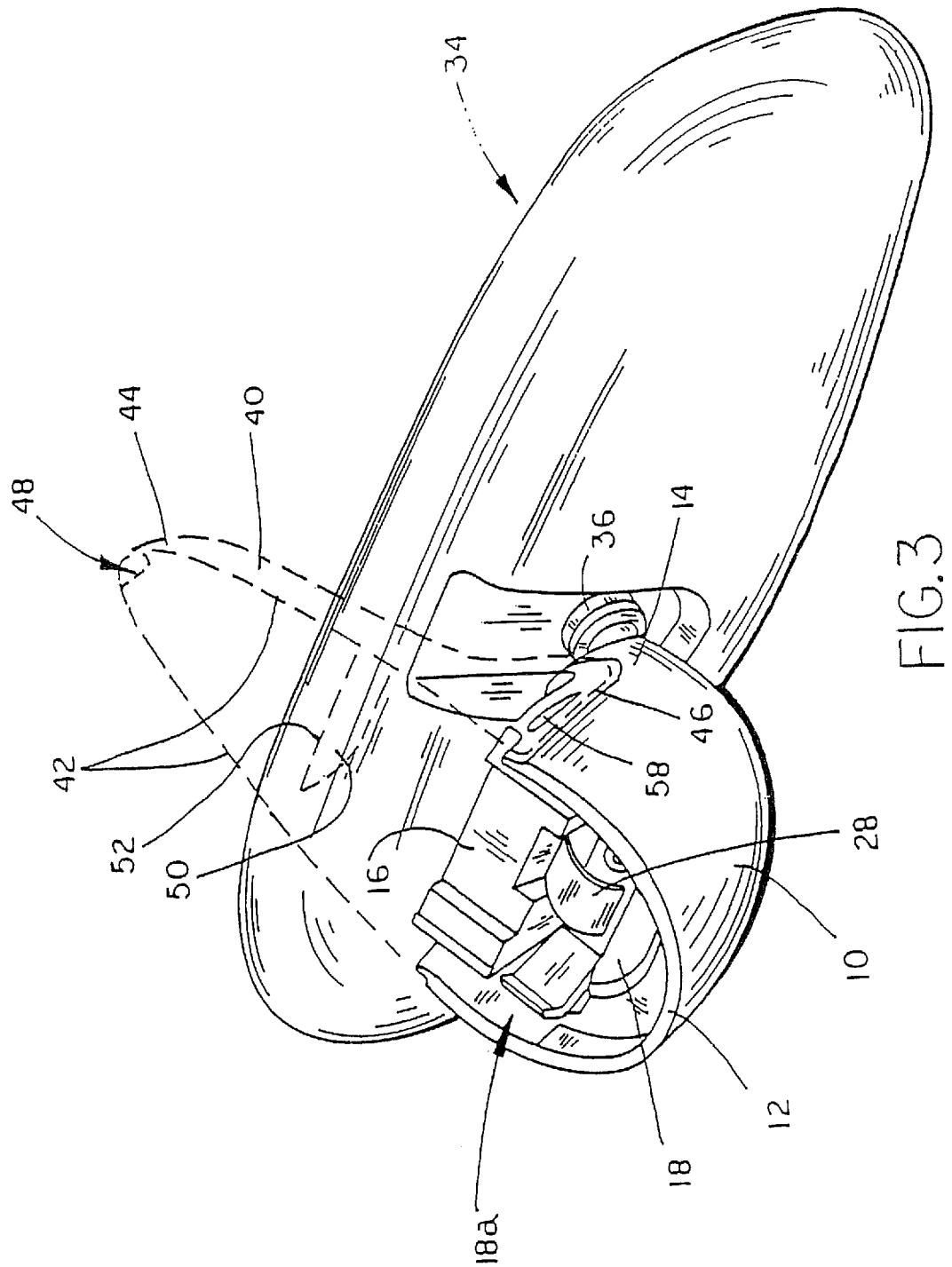
FIG. 3 is a perspective top view of the mirror assembly.
Figure 4:
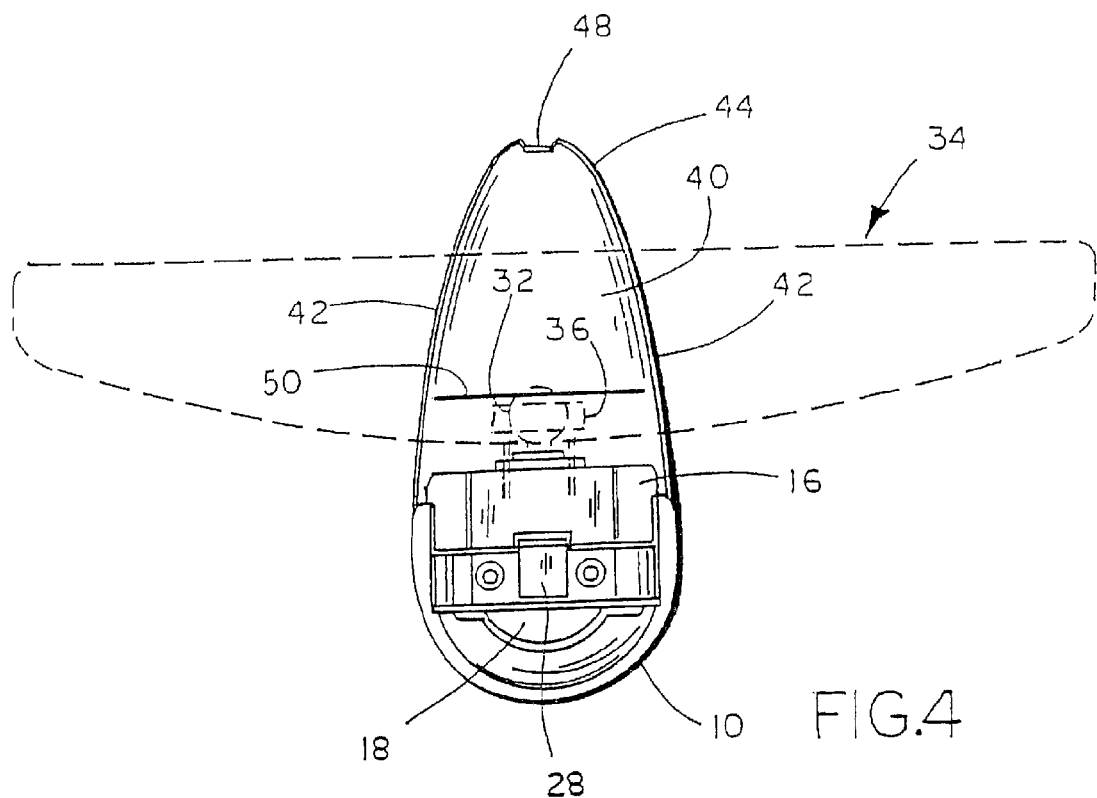
FIG. 4 is a view of the mirror assembly of FIG. 3 looking into the opening 18.

Referring to the drawings, a vehicle interior rearview mirror assembly comprises a die cast metal housing 10 (or optionally may be formed from a plastic moulding such as engineering polymeric resin such as a filled nylon or the like) having a front end 12 and a rear end 14, the front end 12 being releasably attached to the interior surface of the vehicle windshield 22 in a manner to be described. The interior of the housing 10 is subdivided by an internal wall 16 into first and second compartments 18, 20 respectively, the first compartment 18 having an opening 18a at the front end of the housing 10 which in use, and as shown in FIGS. 1 and 2, faces towards the windshield 22 and the second compartment having an opening 20a on the side of the housing which in use faces towards the vehicle header 24 at the top edge of the windshield. The front end 12 of the housing 10 is releasably attached to the windshield 22 using an annular mounting button, not shown, in the manner described in EP 0 928 723 and U.S. patent application Ser. No. 09/003,966, now U.S. Pat. No. 6,250,148, the disclosures of which are incorporated herein by reference.

As shown in the various figures of the Ser. No. 09/003,966 application, it is desirable that the rain sensor mounting member attached to the windshield and the rearview mirror mounting button provided on the rain sensor module are generally aligned along a common axis when the rain sensor module is mounted to the vehicle in order to provide a mounting of a rearview mirror assembly to the rain sensor module that is generally coaxial with the mounting of the rain sensor module to the windshield. Optionally, a ceramic black frit layer, as is commonly known in the windshield fabrication art, can be used on the inner surface of the windshield to hide the attachment location of the rain sensor module. However, the center portion of such a ceramic layer should include a central opening or at least provide efficient transmission for the output of the light emitters and the rain sensor unit at the point of contact of its detecting surface to the windshield or to an adhesive layer. The rain sensor module assembly includes the rain sensor unit, which is positioned in the housing and projects through an opening or port provided on a windshield facing side of the housing and extends through an inner hollow open central portion of the rain sensor mounting button to contact the inner surface of the windshield. The rain sensor unit preferably comprises a compact rain sensor unit available from ITT Automotive Europe, GMBH of Frankfurt, Germany. The rain sensor unit includes a detecting surface which projects through an opening provided in adhesive layer so that direct contact is achieved between the inner surface of the windshield and the detecting surface of the rain sensor unit, and also includes a light emitting source and a light detecting source along with associated electronic circuitry for generating an electrical signal indicative of detection of moisture on the outer surface of the windshield. Light emitted by the emitter passes through the rain sensor detecting surface and is refracted at the outer windshield surface, and re-enters the rain sensor at its detecting surface to impinge the light detector of the rain sensor, whose output is processed by electronic circuitry to detect the presence/absence of moisture on the windshield. The circuitry (in whole or in part) can be contained in the rain sensor and/or within the housing of the module. Optionally, the electronic circuitry can be located/share components with/receive input from or deliver output electrical accessories in the vehicle, such as a CAN bus, electronically equipped mirrors such as lighted mirror and automatic dimming electrochromic mirrors, overhead consoles, and similar electrically functioning vehicle components. Electrical connectors can be accommodated at the rain sensor module, such as at or on its housing. The rain sensor can be separately removable from the module for service, or can be an integral part of the module so that a unitary module is provided by a supplier to the automaker for mating with a windshield mounting member as the vehicle passes along the vehicle assembly line (or at a local ready-to-install windshield supply plant), and thereafter for attachment thereto of a rearview mirror assembly. The electrical signal output by the rain sensor can be used to automatically operate the wiper system for the windshield and/or the backlite, or operate other vehicular functions such as close a sunroof in the event of rain or change the braking and/or traction characteristics of the vehicle braking and/or traction control systems.

Optionally, and as described in the Ser. No. 09/003,966 application, the mount includes an annular or like member having a central opening and is adapted to mount the housing to the inner surface of the windshield. The port of the housing is aligned with the central opening of the annular member so that the rain sensor can extend through the port and through the central opening and contact the inner windshield surface for detecting moisture on an outer surface of the vehicle windshield. The housing is preferably releasably secured to the annular member so that the rain sensor can be serviced or replaced. In addition, at least the second side of the housing substantially covers and conceals the annular member. The rain sensor mount includes a housing having a cover, which covers an access opening in the housing, a means for mounting a rearview mirror assembly to the housing, and a rain sensor, which is positioned in the housing and includes a detecting surface. Furthermore, a biasing member is interposed between a portion of the housing and the rain sensor for urging the detecting surface of the rain sensor to optical couple to the windshield of the vehicle for detecting moisture on an outer surface of the windshield.

Optionally, and as described in the Ser. No. 09/003,966 application, the housing of the rain sensor module assembly is preferably releasably or removably mounted or attached to the rain sensor mounting button by attachment to a solid portion of the rain sensor mounting button, for example by mechanical means such as by snap-on or twist-on attachment or, alternatively, by a releasable adhesive layer. The rain sensor mounting button may comprise of a variety of shapes including square, rectangular, trapezoidal, triangular and the like, with a central opening through which the rain sensor unit extends to position the detecting surface into contact with either the inner surface of the windshield or the outer surface of the adhesive layer. Preferably, the outer rim of the rain sensor mounting button has a smooth edge radius for safety purposes, for example an edge radius of greater than or equal to two millimeters. Also, the attachment of the rain sensor module to the rain sensor mounting button is preferably a breakaway mount, which meets government and automaker safety requirements upon impact during an accident. The mounting member attached to the vehicle windshield such as the rain sensor mounting button can have a wide variety of shapes and forms. It is desirable that there be an adequate contact area with the windshield surface to assure long term integrity of the joint thereto under the loading conditions experienced during lifetime use in the vehicle. The weight of the rearview mirror assembly attached to the mirror mounting button of the rain sensor module can vary from about 100 grams to about 500 grams, or even higher dependent on the feature content of the mirror assembly. The rain sensor module itself is preferably fabricated of lightweight materials, and preferably weighs less than about 100 grams, more preferably less than about 50 grams, and most preferably less that about 25 grams. The mounting member may have a contiguous perimetal portion encompassing a central opening (such as an annulus with a central hole transverse therethrough so that a portion of the inner surface of the windshield is exposed thereat), or the mounting member can be non-contiguous (for example, two spaced apart rails attached to the windshield encompassing an opening therebetween where the detecting surface of the rain sensor can contact the windshield, or the mounting member can be a single rail with an adjacent portion of the inner surface of the windshield serving as the opening for contacting of the rain sensor to the windshield). Also, the rain sensor module can be received on the mounting member such that its engagement on the support attached to the windshield causes the detecting surface of the rain sensor to be urged forward towards, and to contact, the windshield. The module itself, in cooperation with its mounting member on the windshield, serves at least partially as a biasing member.

Optionally, and as described in the Ser. No. 09/003,966 application, the rain sensor module assembly is mounted to the inner surface of the windshield by a rain sensor mounting button. The rain sensor mounting button is preferably adhered to the inner surface of the windshield by a layer of adhesive such as an epoxy, a polyvinyl butyral, a urethane, or a silicone adhesive material or the like. The rain sensor mounting button may be circular in shape having a solid annular outer portion and an inner hollow open central portion. The solid portion of the rain sensor mounting button may comprise a polymer material, such as an engineering resin, a nylon or an ABS material, or can be a metal fabrication such as zinc casting or a sintered steel pressing or equivalent metal material such as steel, titanium, nickel, aluminum and their alloys, or the like.

Optionally, and as described in the Ser. No. 09/003,966 application, a first end of the housing is preferably adapted to rotate or twist onto the rain sensor mounting button and is, preferably, mounted to the rain sensor mounting button in a break-away mounting so that the housing and the interior mirror assembly will detach from the rain sensor mounting button when any one of the housing and the mirror assembly are impacted. The mirror mounting button is mounted to a second end of housing or may be integrally molded therewith.

The compartment 18 contains a rain sensor 26, preferably a compact rain sensor module available from ITT Automotive Europe GmbH of Frankfurt, Germany. The compartment 18 preferably also contains an arcuate steel spring finger 28 which is secured to the base of the compartment 18 behind the rain sensor 26 and preferably serves to bias the rain sensor 26 through the aperture in the mounting button and the opening 18a into optical contact with the windshield 22. Most preferably, rain sensor 26 is a module which has a cross section diameter of at least 25 millimeters (mm), more preferably at least 30 mm, but with a maximum diameters 50 mm, more preferably ≤40 mm, and most preferably ≤35 mm.

The compartment 20 contains at least one further electrical component which is accessible through the opening 20a. In the present embodiment the component is a printed circuit board 30 bearing a compass sensor such as a flux gate, magnetoinductive, magnetoresistive or magnetocapacitive sensor.

At its rear end 14 the housing 10 has an integral ball 32 for releasably and adjustably mounting a rearview mirror unit 34 to the housing 10 generally in conventional manner. The mirror unit 34 comprises a mirror housing 36 containing a mirror 38 which is preferably an electro-optic mirror comprising front and rear plates separated by a space which contains an electro-optic medium such as an electrochromic medium allowing variation in the amount of light transmitted through the medium by varying the strength of an electric field applied across the medium. Alternatively, a prismatic mirror element can be used. Such mirrors are well known in the art. The ball 32 constitutes one part of a ball and socket joint, the socket 36 being carried by the mirror housing 36. The mirror housing is adjustable about the ball and socket joint. Advantageously, the housing 10 is fixedly attached to the windshield when mounted thereto. Thus, adjustment of the mirror housing to set the field of rearward view of the mirror reflective element therein does not effect the position/ orientation of rain sensor and any other accessory housed in fixedly-attached housing 10. This is particularly advantageous when the electrical accessory in housing 10 comprises a compass sensor such as a magneto-resistive sensor, a magneto-inductive sensor, a magneto-capacitive sensor or a fluxgate sensor. By having the housing 10 be fixedly attached, and by having it accommodate at least two electrical accessories (at least one of which preferably comprises a rain sensor that is mounted in the housing 10 so as to view through and preferably contact the windshield inner surface, and with the rain sensor attached to the windshield generally coaxial with the mirror unit that is adjustable about housing 10), a compact overall interior mirror system is provided comprising a housing accommodating a plurality of electrical accessories, the housing fixedly and detachably mounted to a receiving structure on the inner surface (typically a glass surface) of the vehicle windshield and with a mirror unit comprising a mirror support arm and a mirror housing including a reflector element, the mirror support arm/mirror housing being adjustable about the fixed housing (and optionally detachable therefrom). In this manner, the housing 10 presents a minimal footprint when viewed from outside the vehicle through the vehicle windshield.

Figure 7:
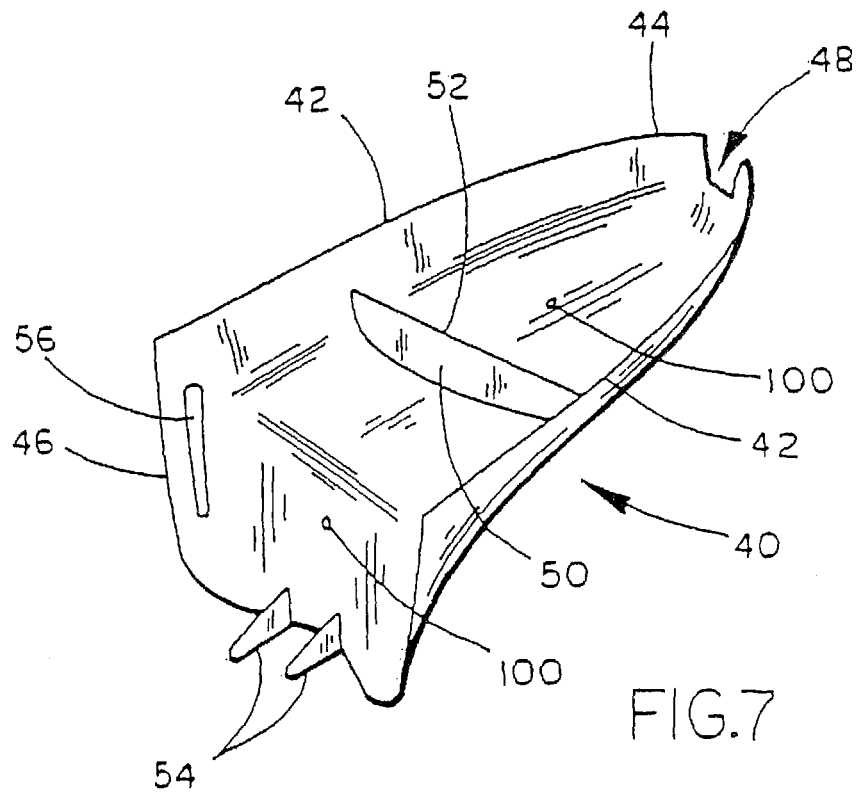
FIG. 7 is a perspective view of the wiring cover forming part of the mirror assembly.

The assembly further includes a removable cover 40 which mates with the housing 10 around the opening 20a and extends along the windshield to the vehicle header 24. The cover 40, which is longitudinally symmetric, is moulded from a resilient, polymeric or plastics material and comprises a pair of opposite, substantially coplanar, longitudinal side edges 42, FIG. 7, which diverge from a relatively narrow rear end 44 of the cover 40 to a relative wide flared front end 46. The flared front end 46 of the cover is open, and there is also a small opening 48 at the narrow rear end 44. The cover 40 has an internal strengthening wall 50 whose free edge 52 is recessed below the level of the edges 42. At its flared front end the cover 40 has a pair of forward projections 54, and the inside surface of the cover has a pair of raised ridges 56 (only one is seen in FIG. 7) each extending along a respective side of the cover adjacent to the front end 46.

The exterior surface of the housing 10 has a corresponding pair of elongated grooves or depressions 58 along each side of the opening 20a, the exterior width of the housing across the opening 20a being substantially the same as the interior width of the cover 40 across the grooves 58.

Figure 5:
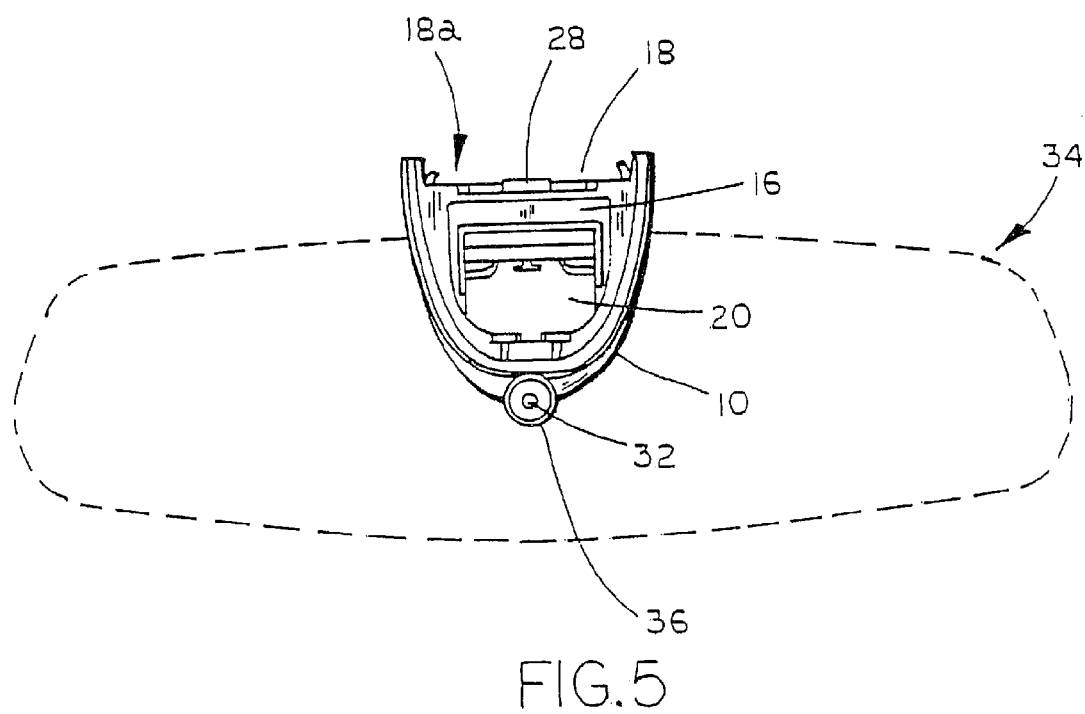
FIG. 5 is a view of the mirror assembly of FIG. 3 looking into the opening 20.
Figure 6:
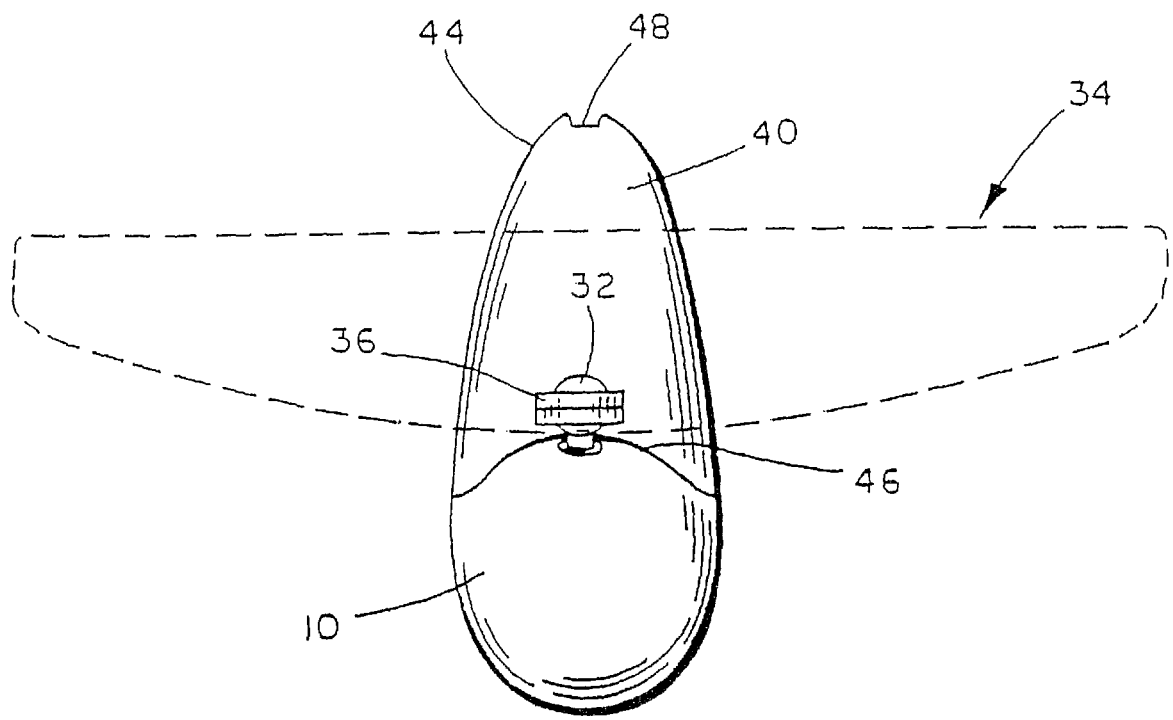
FIG. 6 is a view of the mirror assembly of FIG. 3 looking from underneath.

The cover 40 is fitted to the housing 10 by first inserting the projections 54 into a recess 60, FIGS. 2 and 5, above the opening 20a and then rotating the cover towards the windshield until the ribs 56 snap-engage the grooves 58 (the cover 40 is sufficiently resilient to permit this) and the edges 42 of the cover come to lie flat against the interior surface of the windshield 22, as seen in FIGS. 1 and 2. The cover 40 may be removed by pulling the narrow end 44 away from the windshield until the ribs 56 disengage the grooves 58 and then withdrawing the projection 54 from the recess 60.

The cover 40 serves a dual purpose. First, it protects the compartment 20a and hence the component 30 against the ingress of dust and other contaminants, yet it is easily removed to allow the component 30 to be serviced or replaced, if necessary after removing the mirror unit 34. Secondly, it provides a conduit for electrical leads 62, 64 and 66 respectively from the rain sensor 26, component 30 and (if fitted) the electro-optic or other electrically operated mirror 38.

As seen in FIG. 1, these leads are routed under the cover 40 and through the opening 48 at the rear end 44 of the cover into the vehicle header 24 where they are connected into the vehicle electrical system.

As clearly shown in FIG. 2, the ball joint 32 includes a passageway or a conduit through which can pass the electrical leads connecting to a component such as a electrochromic mirror element 38 or compass display in the mirror head 34. In particular, there is shown a lead 68 connected to a compass display 70 which displays through the mirror element. Alternatively, the display 70 can be located at other positions in the interior rear view mirror assembly, such as in a chin portion or in an eyebrow portion.

Optionally, the removable cover includes at least one opening 100 or port through which a pointed object such as the tip of a ball point pen or a needle or the like can be inserted to activate switches on a PCB located in one of the compartments. Thus, for example, the zone and/or the calibration of a compass PCB can be adjusted without the necessity to remove the removable cover.

Figure 8:
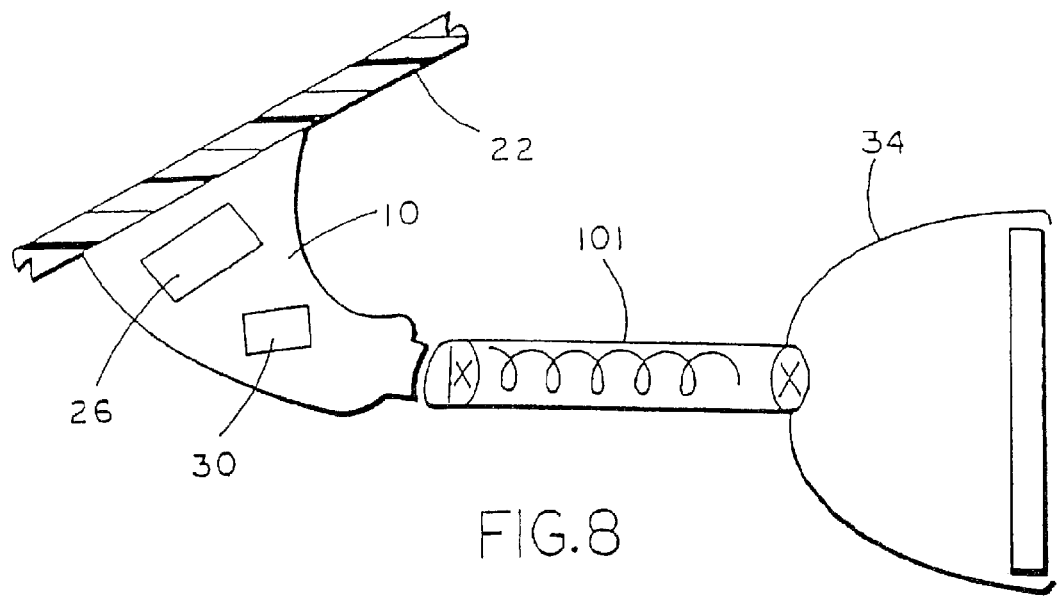
FIG. 8 is a schematic view of another embodiment of vehicle interior mirror assembly according to the invention.
Figure 9:
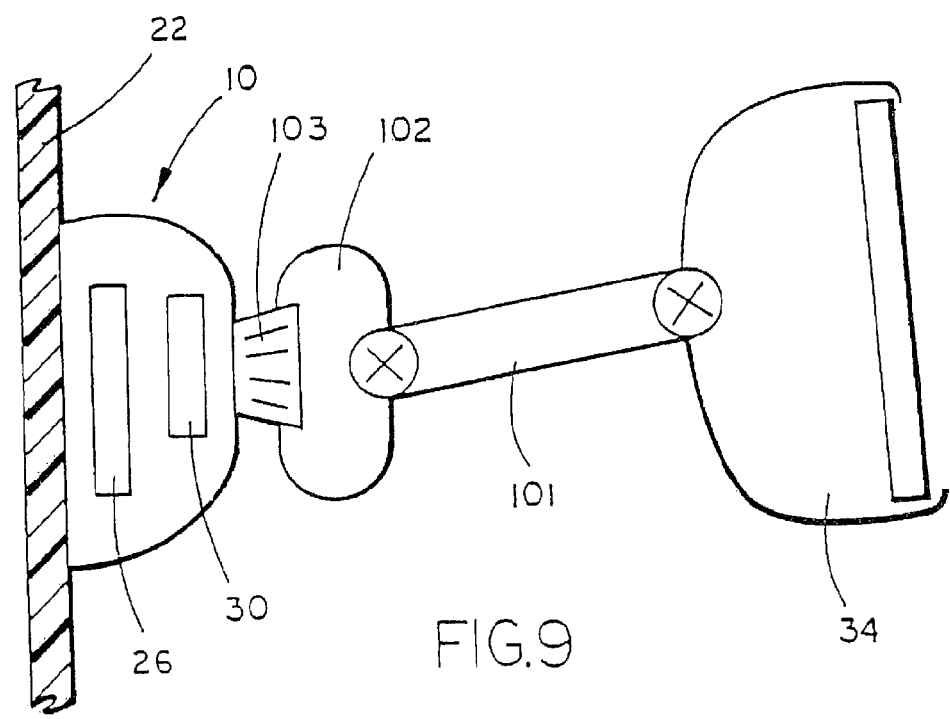
FIG. 9 is a schematic view of yet a further embodiment of a vehicle into rear mirror assembly according to the invention.

Also, a camera may be located on the assembly for example on the housing, or mirror unit or cover and arranged to look either forwardly or rearwardly in terms of the direction of motion of the vehicle, or in another desired direction. In FIGS. 8 and 9 there is shown schematic views of other embodiments of the invention. Thus, in FIG. 8 there is shown the housing 10 containing a rain sensor 26 and another electrical component for example a printed circuit board of a compass sensor 30, with the housing attached to the vehicle windshield 22. The mirror unit 34 is adjustably attached to the housing 10 by a double ball adjustable mirror support arm 101.

In FIG. 9, the mirror support arm 101 is attached to a mirror assembly mount 102. The housing 10 also comprises a mirror assembly mount button 103 which may be fixed to the housing 10 or integrally formed therewith. The mount 102 is detachably attached to the mirror assembly mount button 103.

Although the component 30 has been described as a compass sensor PCB, it can be any of a number of sensors or circuits which can be made small enough to fit in the compartment 20. Preferably, component 30 is provided as a unitary module that is received within compartment 20. Most preferably, component 30 is electrically connected with the electric/electronic wiring provided to the rear view mirror assembly. Thus, an electronic accessory can be provided as a module, can be inserted and received in the rear view mirror assembly, and can make electrical connection (such as by a plug and socket to the rear view mirror assembly). This facilitates and enables the manufacture and supply of the rear view mirror assembly, by a mirror assembly manufacturer, to a vehicle assembly line, and the separate manufacture and supply of the electrical/electronic module to that vehicle assembly line, with the automaker conveniently inserting the electric/electronic module into the compartment of the rear view mirror assembly when the rear view mirror assembly is being mounted on a vehicle passing down a vehicle assembly line.

For example, the compartment 20 may contain a sensor or sensors for vehicle altitude and/or incline, seat occupancy or air bag activation enable/disable, or (if a viewing aperture is made in the housing 10) photosensors for headlamp intensity/ daylight intensity measurement. Alternatively, the compartment 20 may contain a transmitter and/or receiver, along with any associated sensors, for geographic positioning satellite (GPS) systems, pagers, cellular phone systems, ONSTAR™ wireless communication, systems, vehicle speed governors, security systems, tire monitoring systems, remote fueling systems where vehicle fueling and/or payment/charging for fuel is remotely achieved, remote keyless entry systems, garage and/or security door opener systems, INTERNET interfaces, vehicle tracking systems, remote car door unlock systems, e-mail systems, toll booth interactions systems, highway information systems, traffic warning systems, home access systems, garage door openers and the like. Of course, any of the above may be mounted under the cover 40, in addition to the component 30 in the compartment 20.

Where the component 30 is a transmitter or receiver, or where a further component mounted under the cover 40 is a transmitter or receiver, the cover 40 may include an associated antenna. The antenna may mounted as a separate item under the cover 40, or the cover itself may serve as the antenna, being either coated with a layer of conductive material or moulded from a conductive plastics material.

Also, a photosensor may be included in a compartment of the housing, preferably a skyward facing photosensor that views skyward through the vehicle windshield for the purpose of providing automatic headlamp activation/deactivation at dusk/dawn. Also, the housing may include a single microphone or a plurality of microphones for detecting vocal inputs from vehicle occupants for the purpose of cellular phone wireless communication.

Most preferably such microphones provide input to an audio system that transmits and communicates wirelessly with a remote transceiver, preferably in voice recognition mode. Such systems are described in commonly assigned, U.S. patent application Ser. No. 09/382,720, filed Aug. 25, 1999, now U.S. Pat. No. 6,243,003, the disclosure of which is hereby incorporated by reference herein.

In this regard it may be desirable to use audio processing techniques such as digital sound processing to ensure that vocal inputs to the vehicular audio system are clearly distinguished from cabin ambient noise such as from wind noise, HVAC, and the like.

Preferably the housing includes an analog to digital converter and or a digital analog converter for the purpose of converting the analog output of the microphone to a digital signal for input to a digital sound processor and for conversion of the digital output of a digital sound processor to an analog signal for wireless transmission to a remote transceiver.

The housing may include a variety of information displays such as a PSIR (Passenger Side Inflatable Restraint) display, an SIR (Side-Airbag Inflatable Restraint), compass/temperature display, a tire pressure status display or other desirable displays, such as those described in commonly assigned, U.S. patent application Ser. No. 09/244,726, filed Feb. 5, 1999, now U.S. Pat. No. 6,172,613, the disclosure of which is hereby incorporated by reference herein.

For example, the interior rearview mirror assembly may include a display of the speed limit applicable to the location where the vehicle is travelling. Conventionally, speed limits are posted as a fixed limit (for example, 45 MPH) that is read by the vehicle driver upon passing a sign. As an improvement to this, an information display (preferably an alphanumerical display and more preferably, a reconfigurable display) can be provided within the vehicle cabin, readable by the driver, that displays the speed limit at whatever location on the road/highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. Preferably, the in-vehicle receiver is located at and/or the display of local speed limit is displayed at the interior mirror assembly (for example, a speed limit display can be located in a chin or eyebrow portion of the mirror case, such as in the mirror reflector itself, such as in the cover 40, or such as in a pod attached to the interior mirror assembly). More preferably, the actual speed of the vehicle can be displayed simultaneously with and beside the local speed limit in-vehicle display and/or the difference or excess thereto can be displayed. Optionally, the wireless-based speed limit transmission system can actually control the speed at which a subject vehicle travels in a certain location (such as by controlling an engine governor or the like). Thus, a school zone speed limit can be enforced by transmission of a speed-limiting signal into the vehicle. Likewise, different speed limits for the same stretch of highway can be set for different classes of vehicles. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior mirror assembly, or where a microphone or user-interface (such as buttons to connect/interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview mirror assembly (or the exterior side-view mirror assembly). Also, the interior rearview mirror and/or the exterior side view mirrors can function as transceivers/display locations/interface locations for intelligent vehicle highway systems, using protocols such as the BLUETOOTH protocol. Protocols such as BLUETOOTH, as known in the telecommunications art, can facilitate voice/data, voice over data, digital and analogue communication and vehicle/external wireless connectivity, preferably using the interior and/or exterior mirror assemblies as transceiver/display/user-interaction sites. Electronic accessories to achieve the above can be accommodated in housing 10, and/or elsewhere in the interior mirror assembly (such as in the mirror housing). Examples of such electronic accessories include in-vehicle computers, personal organizers/palm computers such as the Palm Pilot™ personal display accessory (PDA), cellular phones and pagers, remote transaction interfaces/systems such as described in commonly assigned, U.S. patent application Ser. No. 09/057,428, filed Apr. 8, 1998, now U.S. Pat. No. 6,158,655, the disclosure of which is hereby incorporated by reference herein, automatic toll booth payment systems, GPS systems, e-mail receivers/displays, a videophone, vehicle security systems, digital radio station transmission to the vehicle by wireless communication as an alternate to having an in-vehicle dedicated conventional radio receiver, traffic/weather broadcast to the vehicle, preferably digitally, and audio play and/or video display thereof in the vehicle, most preferably at the interior rearview mirror, highway hazard warning systems and the like.

The information display at the interior rearview mirror assembly (such as at the mirror housing or viewable in the mirror reflector) may be formed using electronic ink technology and can be reconfigurable. Examples of electronic ink technology include small plastic capsules or microcapsules, typically 1/10 of a millimeter across or thereabouts, that are filled with a dark ink and that have in that ink white particles which carry a charge such as a positive charge. Electrodes place an electric field across the capsules and the electric field can attract or repel the charged particles in the capsules. If the white particle is attracted to the top of a capsule so that it is closest to a viewer, the display element/pixel appears white to the viewer. If the white particle is attracted to the bottom of the capsule (away from the viewer), the display element/pixel appears dark as the viewer now sees the dark ink in the capsule. Such displays are available from E Ink of Cambridge, Mass. Such electronic ink displays have the advantage of forming text or graphics that, once formed, do not disappear when the display powering voltage is disconnected (i.e. they have a long display memory). Alternately, GYRICON™ electronic ink technology developed by XEROX Corporation can be used. Here, microbeads are used that are black (or another dark color) on one side and white (or another light color) on the other side. The beads are dipolar in that one hemisphere carries a stronger (and hence different) charge than the opposing other hemisphere. The beads are small (about 1/10th of a millimeter diameter) and turn or flip when placed in an electric field, with the respective poles of the dipolar beads being attracted to the corresponding polarity of the applied electric field. Thus, a white pixel or a black pixel can be electrically written. Once the bead has turned or flipped, it remains turned or flipped unless an electric potential of the opposite polarity is applied. Thus, the display has memory.

Other types of information displays can be used at the interior mirror location. For example, a field-emission display such as the field-emission display available from Candescent Technologies of San Jose, Calif. can be used. Field-emission displays include a plurality of charge emitting sources or guns that bombard a phosphor screen. For example, a myriad of small or microscopic cones (<1 micron tall, for example and made of a metal such as molybdenum) are placed about a millimeter from phosphors on a screen. The cones emit electrons from their tips or apexes to bombard the phosphors under an applied electric field. This technology is adaptable to provide thin display screens (such as less than 10 mm or so). Alternately, field-emission displays can be made using carbon nanotubes which are cylindrical versions of buckminsterfullerene, and available from Motorola. Such field-emission displays are particularly useful for video displays as they have high brightness and good contrast ratio, even under high ambient lighting conditions such as in a vehicle cabin by day. Such displays can be located at the interior rearview mirror, preferably, or optionally elsewhere in the vehicle cabin such as in the dash, in the windshield header at the top interior edge of the windshield, in a seat back, or the like.

A further advantage of providing a housing 10 which accommodates multiple electrical accessories, preferably in individual compartments, is that incorporation of optional accessories into a specific vehicle is facilitated. It also facilitates supply of the housing 10 and associated mirror unit by a mirror manufacturer and supply of at least one of the electrical accessories by a second, different accessory manufacturer, and with the automaker placing the at least one electrical accessory into the housing 10 at the vehicle assembly plant, preferably at the vehicle assembly line. Thus, for example, an interior mirror assembly can be manufactured by a mirror supplier that includes housing 10, compartments 18 and 20 (or, optionally, more compartments), printed circuit board 30 (such as a compass sensor printed circuit board) in compartment 20 but with compartment 18 empty, removable cover 40, a mirror support arm articulating about housing 20, a mirror housing or case supported on said support arm, a reflector element in said mirror housing (preferably an electrochromic mirror element which includes an information display such as of compass direction and/or temperature displaying through said mirror element as is known in the mirror arts). A rain sensor module can be made by a separate manufacturer. The rain sensor module and the interior mirror assembly can be shipped to a vehicle assembly plant (or local to it). Then, when a particular vehicle requires a rains sensor module, the vehicle manufacturer can place the rain sensor module into compartment 18, connect the rain sensor module to the wire harness provided to mirror assembly (preferably, the rain sensor module docks into compartment 18 in a manner that connects it electrically to the vehicle or alternatively, the rain sensor module includes a plug or socket that connects to a corresponding socket or plug already provided in housing 10 (or elsewhere on the interior mirror assembly). This allows "plug & play" accommodation of multiple accessories into the interior rearview mirror assembly. Also, the interior rearview mirror assembly may be shipped to the assembly plant with both compartments 18 and 20 empty, thus allowing, for example, the automaker to solely place a rain sensor module into compartment 18 but add no further accessory into compartment The invention is not limited to the embodiments described herein which may be modified or varied without departing from the scope of the invention.

The invention claimed is:

1. An accessory mounting system for mounting an electronic device at a windshield of a vehicle, the accessory mounting system comprising:

an interior rearview mirror assembly;

the interior rearview mirror assembly comprising a mirror head and an adjustable support;

a bracket configured to mount at an interior surface of a windshield of a vehicle equipped with the accessory mounting system; and wherein the bracket comprises (i) an attaching structure configured to attach the bracket at the interior surface of the windshield and (ii) a support frame coupled to the attaching structure and to the adjustable support of the interior rearview mirror assembly, wherein the support frame has a set off portion set off from the interior surface of the windshield to accommodate an electronic device between the windshield and the set off portion.

2. The accessory mounting system of claim 1, wherein the support frame further comprises a mirror mounting support to connect the adjustable support to the set off portion set off from the interior surface of the windshield.

3. The accessory mounting system of claim 1, wherein the bracket further comprises multiple mounting structures configured to mount multiple electronic accessories.

4. An accessory mounting system for mounting an electronic device at a windshield of a vehicle, the accessory mounting system comprising:
- a bracket configured to mount at a windshield of a vehicle equipped with the accessory mounting system, the bracket comprising a support frame configured to mount adjacent to the windshield;
- wherein the support frame comprises multiple raised support members extending away from a portion of the windshield;
- wherein the support frame comprises a cross-support member attached to the multiple raised support members to thereby create a region between the multiple raised support members to mount an electronic device; and
- a mirror mounting support connected to the cross-support member that is configured to mount an interior rearview mirror assembly proximate to the windshield.

5. The accessory mounting system of claim 4, wherein the mirror mounting support is integrally connected to the cross-support member.

6. The accessory mounting system of claim 4, wherein the support frame is formed of structurally engineered plastic.

7. The accessory mounting system of claim 4, wherein the bracket has multiple mounting structures configured to mount multiple electronic accessories.

8. The accessory mounting system of claim 7, wherein the multiple mounting structures comprise a rain sensor support structure configured to support a rain sensor adjacent to the windshield.

9. The accessory mounting system of claim 4, wherein the multiple raised support members and the cross-support member are integrally formed.

10. An accessory mounting system for mounting an electronic device at a windshield of a vehicle, the accessory mounting system comprising:
- a bracket mounted adjacent to a windshield of a vehicle equipped with the accessory mounting system;
- the bracket comprising (i) an attaching structure attaching the bracket to the windshield and (ii) a mirror mounting support mounting an interior rearview mirror assembly, wherein the mirror mounting support is set off from the windshield; and
- a first mounting structure supporting a first electronic device between the mirror mounting support and the windshield, wherein the bracket supports the first electronic device such that a portion of the first electronic device has access to the windshield.

11. The accessory mounting system of claim 10, wherein the bracket is formed of structurally engineered plastic.

12. The accessory mounting system of claim 10, wherein the bracket further comprises a second mounting structure configured to support a second electronic device.

13. The accessory mounting system of claim 10, wherein the first mounting structure is configured to support a camera, and wherein the bracket has multiple mounting structures configured to mount multiple electronic devices, the multiple mounting structures comprising at least a rain sensor support structure configured to support a rain sensor adjacent to the windshield.

14. The accessory mounting system of claim 10, wherein the equipped vehicle has a centerplane, wherein the windshield has a centerline traversing the centerplane, and wherein the bracket is mounted along the centerplane of the equipped vehicle and adjacent to the centerline of the windshield.

15. The accessory mounting system of claim 14, wherein the interior rearview mirror assembly is mounted substantially along the centerplane of the equipped vehicle.

16. An accessory mounting system for mounting at least one electronic device at a windshield of a vehicle, the accessory mounting system comprising:
- an interior rearview mirror assembly;
- the interior rearview mirror assembly comprising a mirror head and an adjustable support;
- the mirror head pivotable about the adjustable support via a ball and socket pivot joint;
- a bracket configured to mount at a windshield of a vehicle equipped with the accessory mounting system;
- the bracket comprising an attaching structure configured to attach the bracket at an interior surface of the windshield;
- the bracket configured to accommodate an electronic device;
- wherein, when accommodated by the bracket and with the bracket mounted at the windshield of the equipped vehicle, a sensing part of the electronic device at least one of (i) views through the windshield via an opening in the attaching structure and (ii) contacts the windshield via an opening in the attaching structure;
- wherein, with the interior rearview mirror assembly mounted in the equipped vehicle and with the bracket mounted at the windshield and accommodating the electronic device, the electronic device is disposed behind the mirror head, and the adjustable support of the interior rearview mirror assembly extends away from the bracket and the windshield to the mirror head;
- wherein the bracket comprises a support frame coupled to the attaching structure; and
- wherein the support frame has a set off portion set off from the interior surface of the windshield to accommodate the electronic device between the windshield and the set off portion.

17. The accessory mounting system of claim 16, wherein the support frame further comprises a mirror mounting support to connect the adjustable support of the interior rearview mirror assembly to the set off portion set off from the interior surface of the windshield.

18. The accessory mounting system of claim 16, wherein the bracket comprises multiple mounting structures configured to mount multiple electronic devices.

19. The accessory mounting system of claim 16, wherein the attaching structure adhesively attaches at the interior surface of the windshield.

20. The accessory mounting system of claim 16, wherein the electronic device comprises a rain sensor.

21. The accessory mounting system of claim 16, wherein the electronic device comprises a forwardly-viewing camera.

22. An accessory mounting system for mounting at least one electronic device at a windshield of a vehicle, the accessory mounting system comprising:
- a bracket configured to mount at a windshield of a vehicle equipped with the accessory mounting system;
- the bracket configured to accommodate an electronic device;
- wherein the bracket comprises a support frame configured to mount to the windshield and wherein the support frame comprises an attaching structure configured to mount at the windshield;
- wherein, when accommodated by the bracket and with the bracket mounted at the windshield of the equipped vehicle, the electronic device is at least partially accepted at an opening in the attaching structure and wherein a sensing part of the electronic device at least one of (i) views through the windshield via an opening in the attaching structure and (ii) contacts the windshield via an opening in the attaching structure;

wherein the support frame comprises multiple raised support members extending away from the attaching structure and the windshield;

wherein the support frame comprises a cross-support member attached to the multiple raised support members to thereby create a region between the multiple raised support members and the cross-support member to mount the electronic device;

a mirror mounting support connected to the cross-support member that is configured to mount an interior rearview mirror assembly on the opposite side of the electronic device from the windshield, the interior mirror assembly comprising a mirror head; and wherein, with the interior mirror assembly mounted in the equipped vehicle and with the bracket mounted at the windshield and accommodating the electronic device, the mirror head of the interior mirror assembly at least partially obscures view of the electronic device by a driver of the equipped vehicle.

23. The accessory mounting system of claim 22, wherein the mirror mounting support is integrally connected to the cross-support member.

24. The accessory mounting system of claim 22, wherein the support frame is formed of structurally engineered plastic.

25. The accessory mounting system of claim 22, wherein the bracket has multiple mounting structures configured to mount multiple electronic devices.

26. The accessory mounting system of claim 25, wherein the multiple mounting structures comprise a rain sensor support structure configured to support a rain sensor at the windshield.

27. The accessory mounting system of claim 22, wherein the multiple raised support members and the cross-support member are integrally formed.

28. The accessory mounting system of claim 22, wherein the electronic device comprises a rain sensor.

29. The accessory mounting system of claim 22, wherein the electronic device comprises a forwardly-viewing camera.

30. An accessory mounting system for mounting at least one electronic device at a windshield of a vehicle, the accessory mounting system comprising:

a bracket mounted at a windshield of a vehicle equipped with the accessory mounting system;

the bracket comprising a substantially flat attaching structure attaching the bracket to a surface of the windshield;

the bracket configured to accommodate an electronic device;

wherein, when accommodated by the bracket and with the bracket mounted at the windshield of the equipped vehicle, the electronic device at least one of (i) views through the windshield via an opening in the attaching structure and (ii) contacts the windshield via an opening in the attaching structure;

a mirror mounting support mounting an interior rearview mirror assembly, wherein the mirror mounting support is set off from the windshield; and wherein the bracket supports the electronic device behind the mirror mounting support.

31. The accessory mounting system of claim 30, wherein the bracket is formed of structurally engineered plastic.

32. The accessory mounting system of claim 30, wherein the bracket is configured to support a second electronic device.

33. The accessory mounting system of claim 30, wherein the bracket is configured to support a camera.

34. The accessory mounting system of claim 30, wherein the bracket has multiple mounting structures configured to mount multiple electronic devices.

35. The accessory mounting system of claim 34, wherein the multiple mounting structures comprise at least a rain sensor support structure configured to support a rain sensor adjacent to the windshield.

36. The accessory mounting system of claim 30, wherein the equipped vehicle has a centerplane, wherein the windshield has a centerline traversing the centerplane, and wherein the bracket is mounted generally along the centerplane of the equipped vehicle and adjacent to the centerline of the windshield.

37. The accessory mounting system of claim 36, wherein the interior rearview mirror assembly is mounted generally along the centerplane of the equipped vehicle.

38. The accessory mounting system of claim 30, wherein the electronic device comprises a rain sensor.

39. The accessory mounting system of claim 30, wherein the electronic device comprises a forwardly-viewing camera.

40. An accessory mounting system for mounting at least one electronic device at a windshield of a vehicle, the accessory mounting system comprising:

a bracket configured to mount at a windshield of a vehicle equipped with the accessory mounting system, the bracket configured to accommodate an electronic device;

wherein the bracket comprises a support frame configured to mount to the windshield and wherein the support frame comprises an attaching structure configured to mount to the windshield;

wherein, when accommodated by the bracket and with the bracket mounted at a windshield of the equipped vehicle, a sensing part of the electronic device at least one of (i) views through the windshield via an opening in the attaching structure and (ii) contacts the windshield via an opening in the attaching structure;

wherein the support frame comprises multiple raised support members extending away from the attaching structure and the windshield;

wherein the support frame comprises a cross-support member attached to the multiple raised support members to thereby create a region between the multiple raised support members and the cross-support member to mount the electronic device; and wherein the electronic device comprises a camera.

41. The accessory mounting system of claim 40, wherein a mirror mounting support connects to the cross-support member, and wherein the mirror mounting support is configured to mount an interior rearview mirror assembly on the opposite side of the electronic device from the windshield, and wherein the interior mirror assembly comprises a mirror head.

42. The accessory mounting system of claim 40, wherein an interior mirror assembly is mounted in the equipped vehicle and wherein the interior mirror assembly comprises a mirror head, and with the bracket mounted at the windshield and accommodating the electronic device, the mirror head of the interior mirror assembly at least partially obscures view of the electronic device by a driver of the equipped vehicle.

43. The accessory mounting system of claim 40, wherein the electronic device is at least partially received at the opening in the attaching structure.

44. An accessory mounting system for mounting at least one electronic device at a windshield of a vehicle, the accessory mounting system comprising:
- a bracket configured to mount at a windshield of a vehicle equipped with the accessory mounting system, the bracket configured to accommodate at least a first electronic device and a second electronic device;
- wherein the bracket comprises a support frame configured to mount to the windshield and wherein the support frame comprises an attaching structure configured to mount to the windshield;
- wherein, when accommodated by the bracket and with the bracket mounted at a windshield of the equipped vehicle, and wherein a sensing part of the first electronic device at least one of (i) views through the windshield via an opening in the attaching structure and (ii) contacts the windshield via an opening in the attaching structure;
- wherein, when accommodated by the bracket and with the bracket mounted at a windshield of the equipped vehicle, and wherein a sensing part of the second electronic device at least one of (i) views through the windshield via an opening in the attaching structure and (ii) contacts the windshield via an opening in the attaching structure; and
- wherein the first electronic device comprises a camera.

45. The accessory mounting system of claim 44, wherein a mirror mounting support connects to the cross-support member, and wherein the mirror mounting support is configured to mount an interior rearview mirror assembly on the opposite side of the electronic device from the windshield, and wherein the interior mirror assembly comprises a mirror head.

46. The accessory mounting system of claim 44, wherein an interior mirror assembly is mounted in the equipped vehicle and wherein the interior mirror assembly comprises a mirror head, and with the bracket mounted at the windshield and accommodating the electronic device, the mirror head of the interior mirror assembly at least partially obscures view of the electronic device by a driver of the equipped vehicle.

47. The accessory mounting system of claim 44, wherein the support frame comprises multiple raised support members extending away from the attaching structure and the windshield.

48. The accessory mounting system of claim 47, wherein the support frame comprises a cross-support member attached to the multiple raised support members to thereby create a region between the multiple raised support members and the cross-support member to mount at least one of (i) the first electronic device and (ii) the second electronic device.

49. The accessory mounting system of claim 44, wherein the second electronic device comprises a rain sensor.

50. The accessory mounting system of claim 44, the first electronic device is at least partially received at an opening in the attaching structure.

51. The accessory mounting system of claim 44, the second electronic device is at least partially received at an opening in the attaching structure.

* * * * *

UNITED STATES PATENT AND TRADEMARK OFFICE
CERTIFICATE OF CORRECTION

PATENT NO. : 9,035,233 B2
APPLICATION NO. : 13/749833
DATED : May 19, 2015
INVENTOR(S) : Patrick Heslin and Niall R. Lynam Page 1 of 1

It is certified that error appears in the above-identified patent and that said Letters Patent is hereby corrected as shown below:

Specification:

Column 6
Line 48, "diameters 50 mm" should be --diameter ≤ 50 mm--

Column 12
Lines 33-34, "compartment The" should be --compartment 20. The--

Signed and Sealed this
Twenty-first Day of June, 2016

Michelle K. Lee
*Director of the United States Patent and Trademark Office*